US009355298B2

(12) United States Patent
Semba

(10) Patent No.: US 9,355,298 B2
(45) Date of Patent: May 31, 2016

(54) FINGERPRINT AUTHENTICATION APPARATUS, METHOD, AND RECORDING MEDIUM

(75) Inventor: Satoshi Semba, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 346 days.

(21) Appl. No.: 13/558,539

(22) Filed: Jul. 26, 2012

(65) Prior Publication Data

US 2012/0286931 A1 Nov. 15, 2012

Related U.S. Application Data

(63) Continuation of application No. PCT/JP2010/051168, filed on Jan. 28, 2010.

(51) Int. Cl.
G06K 9/00 (2006.01)
G06F 21/32 (2013.01)
G07C 9/00 (2006.01)

(52) U.S. Cl.
CPC ............ *G06K 9/00087* (2013.01); *G06F 21/32* (2013.01); *G06K 9/00006* (2013.01); *G06K 9/00885* (2013.01); *G06K 9/00* (2013.01); *G06K 9/00107* (2013.01); *G07C 9/00071* (2013.01)

(58) Field of Classification Search
CPC  G06F 21/32; G07C 9/00031; G07C 9/00087; G07C 9/00158; G07C 9/00071
USPC .............. 340/5.52–5.53, 5.82–5.85; 382/115, 382/116, 126; 713/186
See application file for complete search history.

(56) References Cited

U.S. PATENT DOCUMENTS

| 6,072,891 A * | 6/2000 | Hamid et al. ................. 382/116 |
| 6,463,165 B1 * | 10/2002 | Ito ................................. 382/124 |
| 6,751,733 B1 * | 6/2004 | Nakamura et al. ............ 713/182 |
| 7,184,579 B2 * | 2/2007 | Mizoguchi .................... 382/124 |
| 8,542,095 B2 * | 9/2013 | Kamei .......................... 340/5.82 |
| 2003/0099381 A1 * | 5/2003 | Ohba ............................ 382/124 |
| 2008/0273769 A1 * | 11/2008 | Lo et al. ....................... 382/125 |

FOREIGN PATENT DOCUMENTS

| JP | 11-96358 | 4/1999 |
| JP | 2000-11179 | 1/2000 |
| JP | 2004-78791 | 3/2004 |

OTHER PUBLICATIONS

International Search Report of Corresponding PCT Application PCT/JP2010/051168 mailed Feb. 23, 2010.

* cited by examiner

Primary Examiner — Mohamed Barakat
(74) Attorney, Agent, or Firm — Staas & Halsey LLP

(57) ABSTRACT

A fingerprint authentication apparatus stores fingerprint data of plural fingers. The fingerprint authentication apparatus stores a history of a result of an authentication process executed using the fingerprint data. The fingerprint authentication apparatus determines the number of accepted fingers, which is the number of fingers from which the fingerprint data is accepted from a user during the authentication process, and a false acceptance rate based upon the history. The fingerprint authentication apparatus accepts the fingerprint data from the fingers in the determined number of accepted fingers. The fingerprint authentication apparatus collates whether each of the accepted fingerprint data coincides or not using the determined false acceptance rate. The fingerprint authentication apparatus authenticates a user based upon a collation result.

15 Claims, 11 Drawing Sheets

FIG.3A

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
| --- | --- | --- | --- | --- | --- |
| 3 FINGERS SUCCEED IN COLLATION | 1/27 | 1/22 | 1/16 | 1/10 | non |
| 2 FINGERS SUCCEED IN COLLATION | 1/122 | 1/99 | 1/77 | 1/55 | 1/33 |

FIG.3B

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
| --- | --- | --- | --- | --- | --- |
| 3 FINGERS SUCCEED IN COLLATION | 1/58 | 1/46 | 1/34 | 1/22 | non |
| 2 FINGERS SUCCEED IN COLLATION | 1/400 | 1/333 | 1/250 | 1/180 | 1/100 |

FIG.3C

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
| --- | --- | --- | --- | --- | --- |
| 3 FINGERS SUCCEED IN COLLATION | 1/126 | 1/100 | 1/74 | 1/47 | non |
| 2 FINGERS SUCCEED IN COLLATION | 1/1224 | 1/999 | 1/774 | 1/548 | 1/317 |

FIG.3D

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
| --- | --- | --- | --- | --- | --- |
| 3 FINGERS SUCCEED IN COLLATION | 1/271 | 1/215 | 1/159 | 1/100 | non |
| 2 FINGERS SUCCEED IN COLLATION | 1/3872 | 1/3162 | 1/2449 | 1/1732 | 1/1000 |

FIG.4A

| i | P(%) |
|---|---|
| 0 | 94.1480149401 |
| 1 | 5.7059402994 |
| 2 | 0.1440894015 |
| 3 | 0.0019405980 |
| 4 | 0.0000147015 |
| 5 | 0.0000000594 |
| 6 | 0.0000000001 |

FIG.4B

| i | P(%) |
|---|---|
| 0 | 90.4075223787 |
| 1 | 9.1939853266 |
| 2 | 0.3895756494 |
| 3 | 0.0088039695 |
| 4 | 0.0001119149 |
| 5 | 0.0000007587 |
| 6 | 0.0000000021 |

FIG.5

| | | USER NAME | YAMADA | SUZUKI | TANAKA | YOSHIDA |
|---|---|---|---|---|---|---|
| | | USER ID | yamada | suzuki | tanaka | yoshida |
| | | ACHIEVEMENT FAR | 1/10000 | 1/10000 | 1/10000 | 1/10000 |
| | | COLLATION FREQUENCY | 286 | 312 | 243 | 323 |
| | | SUCCESS FREQUENCY | 216 | 252 | 212 | 272 |
| | | NUMBER OF ACCEPTED FINGERS | 5 | 4 | 3 | 4 |
| | | NUMBER OF SUCCESSFUL FINGERS | 3 | 2 | 2 | 3 |
| INDEX FINGER OF RIGHT HAND | | USE | × | × | ○ | ○ |
| | | SUCCESS RATE | 0/0=0% | 0/0=0% | 202/243=83% | 233/323=72% |
| | | REGISTERED FINGERPRINT DATA | NO | NO | YES | YES |
| MIDDLE FINGER OF RIGHT HAND | | USE | ○ | ○ | ○ | ○ |
| | | SUCCESS RATE | 192/286=67% | 296/312=95% | 182/243=75% | 251/323=78% |
| | | REGISTERED FINGERPRINT DATA | YES | YES | YES | YES |
| ANNULAR FINGER OF RIGHT HAND | | USE | ○ | ○ | × | × |
| | | SUCCESS RATE | 157/286=55% | 212/312=68% | 139/210=66% | 103/240=43% |
| | | REGISTERED FINGERPRINT DATA | YES | YES | YES | YES |
| INDEX FINGER OF LEFT HAND | | USE | ○ | ○ | ○ | ○ |
| | | SUCCESS RATE | 186/286=65% | 285/312=85% | 190/243=78% | 226/323=70% |
| | | REGISTERED FINGERPRINT DATA | YES | YES | YES | YES |
| MIDDLE FINGER OF LEFT HAND | | USE | ○ | ○ | × | ○ |
| | | SUCCESS RATE | 126/286=44% | 225/312=72% | 99/180=55% | 225/323=70% |
| | | REGISTERED FINGERPRINT DATA | YES | YES | YES | YES |
| ANNULAR FINGER OF LEFT HAND | | USE | ○ | × | × | × |
| | | SUCCESS RATE | 117/286=41% | 113/270=41% | 0/0=0% | 0/0=0% |
| | | REGISTERED FINGERPRINT DATA | YES | YES | NO | NO |

FIG.6A

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
|---|---|---|---|---|---|
| 3 FINGERS SUCCEED IN COLLATION | 1/58 → | 1/46 → | 1/34 → | 1/22 → | non |
| 2 FINGERS SUCCEED IN COLLATION | 1/400 → | 1/333 → | 1/250 → | 1/180 → | 1/100 |

FIG.6B

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
|---|---|---|---|---|---|
| 3 FINGERS SUCCEED IN COLLATION | 1/58 | 1/46 | 1/34 | 1/22 | non |
| 2 FINGERS SUCCEED IN COLLATION | ↓ 1/400 | ↓ 1/333 | ↓ 1/250 | ↓ 1/180 | 1/100 |

FIG.6C

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
|---|---|---|---|---|---|
| 3 FINGERS SUCCEED IN COLLATION | 1/58 | 1/46 | 1/34 | 1/22 | non |
| 2 FINGERS SUCCEED IN COLLATION | 1/400 | 1/333 → | 1/250 → | 1/180 → | 1/100 |

FIG.6D

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
|---|---|---|---|---|---|
| 3 FINGERS SUCCEED IN COLLATION | ↑ 1/58 | ↑ 1/46 | ↑ 1/34 | ↑ 1/22 | non |
| 2 FINGERS SUCCEED IN COLLATION | 1/400 | 1/333 | 1/250 | 1/180 | 1/100 |

FIG.6E

|  | 6 FINGERS NOW IN COLLATION | 5 FINGERS NOW IN COLLATION | 4 FINGERS NOW IN COLLATION | 3 FINGERS NOW IN COLLATION | 2 FINGERS NOW IN COLLATION |
|---|---|---|---|---|---|
| 3 FINGERS SUCCEED IN COLLATION | 1/58 ← | 1/46 ← | 1/34 ← | 1/22 | non |
| 2 FINGERS SUCCEED IN COLLATION | 1/400 ← | 1/333 ← | 1/250 ← | 1/180 ← | 1/100 |

FINGERPRINT AUTHENTICATION APPARATUS, METHOD, AND RECORDING MEDIUM

CROSS-REFERENCE TO RELATED APPLICATION

This application is a continuation application of International Application PCT/JP2010/051168, filed on Jan. 28, 2010, and designated the U.S., the entire contents of which are incorporated herein by reference.

FIELD

The present invention relates to a fingerprint authentication apparatus, a fingerprint authentication method, and a fingerprint authentication program.

BACKGROUND

There has conventionally been an authentication apparatus that authenticates a user by using a fingerprint. Specifically, fingerprint data related to a fingerprint of a user is registered beforehand to the authentication apparatus. For example, image data of a fingerprint is preliminarily stored in the authentication apparatus, or data involved with characteristic points contained in a fingerprint is preliminarily stored in the authentication apparatus. During the authentication, the authentication apparatus acquires fingerprint data from the user, and compares the fingerprint data to the fingerprint data preliminarily stored, thereby authenticating the user. When the authentication apparatus fails in authenticating the user in one authentication process, it acquires again the fingerprint data from the user, and executes again the authentication process by using the acquired fingerprint data, for example. The authentication apparatus continues to acquire the fingerprint data from the user until it succeeds in authentication.

There is an authentication apparatus that increases or decreases FAR (false acceptance rate) during the authentication based upon a number of times of acquiring the fingerprint data until the apparatus succeeds in authentication. For example, when the number of times of acquiring the fingerprint data is not less than a threshold value, the authentication apparatus that increases or decreases the false acceptance rate increases the false acceptance rate used for the subsequent process. Increasing the false acceptance rate means that the possibility of falsely recognizing a person who should not be recognized becomes high. In other words, when the false acceptance rate increases, the accuracy in the authentication is deteriorated.

There is also an authentication apparatus that sets a number of fingers used for the authentication or the false acceptance rate based upon the condition of the finger, when the fingerprint data is registered. For example, for a person having a satisfactory finger's condition, the authentication apparatus that sets the number of fingers sets that two fingers are used, and sets the false acceptance rate that is smaller than that for a person having unsatisfactory finger's condition, and when the fingerprint data preliminarily registered and the fingerprint of one finger coincide with each other, it determines that the authentication is successful. For a person having unsatisfactory finger's condition, the authentication apparatus that sets the number of fingers sets that three fingers are used, and sets the false acceptance rate that is larger than that for a person having satisfactory finger's condition, and when the fingerprint data preliminarily registered and the fingerprint of three fingers coincide with each other, it determines that the authentication is successful. The authentication apparatus authenticates the user during the authentication by using the number of fingers or the false acceptance rate set upon the registration.

Patent Document 1: Japanese Laid-open Patent Publication No. 2000-011179

Patent Document 2: Japanese Laid-open Patent Publication No. 11-096358

However, the authentication apparatus that increases or decreases the false acceptance rate entails a problem of deterioration in authentication accuracy. Specifically, when the number of times of acquiring the fingerprint data is not less than the threshold value, the authentication apparatus that increases or decreases the false acceptance rate decreases the false acceptance rate, which deteriorates the authentication accuracy.

The authentication apparatus that sets a number of fingers entails a problem of deterioration in operability when the condition of the finger during the authentication is different from the condition of the finger during the registration. Specifically, when the condition of the finger is deteriorated compared to the condition during the registration, the authentication apparatus that sets the number of fingers does not succeed in the authentication even with the false acceptance rate set during the registration. In other words, the apparatus falsely recognizes that a normal user is not a normal user. Thus, the operability is deteriorated.

When the condition of the finger is enhanced compared to the condition during the registration, the authentication apparatus that sets the number of fingers applies extra load to the user. For example, the case where the apparatus sets that three fingers are used during the registration, but only one finger is enough during the authentication will be described. In this case, the authentication apparatus that sets the number of fingers acquires fingerprint data from three fingers, although it is only enough to acquire the fingerprint data from one finger. In other words, extra load is applied to the user, which deteriorates operability.

SUMMARY

According to an aspect of an embodiment of the invention, a fingerprint authentication apparatus includes a memory; and a processor coupled to the memory, wherein the processor executes a process including: first storing fingerprint data of plural fingers; second storing a history of a result of an authentication process executed using the fingerprint data stored by the first storing; determining the number of accepted fingers, which is the number of fingers from which the fingerprint data is accepted from a user during the authentication process, and a false acceptance rate, which is a threshold value upon determining a coincidence or non-coincidence according to a degree of similarity of fingerprints, based upon the history stored by the second storing; first accepting the fingerprint data from the fingers in the number of accepted fingers determined by the determining; collating whether each of the fingerprint data accepted by the first accepting and the fingerprint data stored by the first storing coincide with each other or not using the false acceptance rate determined by the determining; and authenticating a user based upon a collation result by the collating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a view for describing an FAR table when authentication accuracy by the fingerprint authentication apparatus is 1/1000.

FIG. 3B is a view for describing an FAR table when authentication accuracy by the fingerprint authentication apparatus is 1/1000.

FIG. 3C is a view for describing an FAR table when authentication accuracy by the fingerprint authentication apparatus is 1/1000.

FIG. 3D is a view for describing an FAR table when authentication accuracy by the fingerprint authentication apparatus is 1/1000.

FIG. 4A is a view for describing a relationship among a number of successful fingers, a false acceptance rate, and authentication accuracy.

FIG. 4B is a view for describing a relationship among a number of successful, a false acceptance rate, and authentication accuracy.

FIG. 5 is a view for describing one example of information stored in a user table 302 in the second embodiment.

FIG. 6A is a view for describing a (Type 1) in a determination process by a determining unit in the second embodiment.

FIG. 6B is a view for describing a (Type 2) in the determination process by the determining unit in the second embodiment.

FIG. 6C is a view for describing a (Type 3) in the determination process by the determining unit in the second embodiment.

FIG. 6D is a view for describing a (Type 4) in the determination process by the determining unit in the second embodiment.

FIG. 6E is a view for describing a (Type 5) in the determination process by the determining unit in the second embodiment.

DESCRIPTION OF EMBODIMENTS

Embodiments of disclosed fingerprint authentication apparatus, fingerprint authentication method, and fingerprint authentication program will be described below with reference to the drawings. The present invention is not limited by these embodiments. The respective embodiments can be combined, as needed, within a range in which the content of the process is consistent.

First Embodiment

Figure 1:
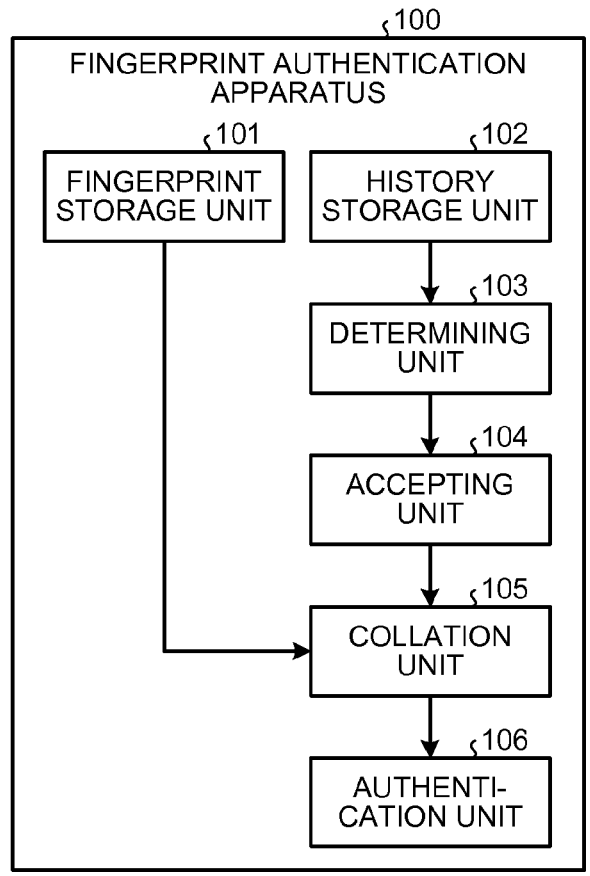
FIG. 1 is a block diagram illustrating one example of a configuration of a fingerprint authentication apparatus according to a first embodiment.

A fingerprint authentication apparatus 100 according to the first embodiment will be described with reference to FIG. 1. FIG. 1 is a block diagram illustrating one example of a configuration of the fingerprint authentication apparatus according to the first embodiment. The fingerprint authentication apparatus 100 includes a fingerprint storage unit 101 that stores fingerprint data for plural fingers, and a history storage unit 102 that stores a history of a result of an authentication process executed by using the fingerprint data stored in the fingerprint storage unit 101.

In the fingerprint authentication apparatus 100, a determining unit 103 determines a number of accepted fingers that is a number of fingers from which fingerprint data is accepted from a user during the authentication process, and a false acceptance rate that is a threshold value upon determining a coincidence or non-coincidence according to a degree of similarity of fingerprints, based upon the history stored in the history storage unit 102. An accepting unit 104 accepts the fingerprint data from the finger in the number of accepted fingers determined by the determining unit 103. A collation unit 105 collates whether each of the fingerprint data pieces accepted by the accepting unit 104 and the fingerprint data stored in the fingerprint storage unit 101 coincide with each other or not by using the false acceptance rate determined by the determining unit 103. An authentication unit 106 authenticates a user based upon the collation result by the collation unit 105.

As described above, according to the first embodiment, the accuracy of the fingerprint authentication can be kept high, and operability can be enhanced. Specifically, the fingerprint authentication apparatus 100 determines the number of accepted fingers and the false acceptance rate in order that the authentication accuracy becomes equivalent. Therefore, even if the false acceptance rate is decreased, the number of accepted fingers is determined to have equivalent authentication accuracy, whereby the accuracy of the fingerprint authentication can be kept high.

Even if the condition of the finger during the authentication is different from the condition of the finger during the registration, the fingerprint authentication apparatus 100 determines the number of accepted fingers and the false acceptance rate based upon the history of the result of the authentication process, thereby being capable of enhancing operability. Specifically, when the condition of the finger becomes poor compared to the condition during the registration, the fingerprint authentication apparatus 100 determines a false acceptance rate, which is larger than the false acceptance rate set during the registration, and determines the number of accepted fingers so as to have equivalent authentication accuracy, based upon the history of the result of the authentication process. Consequently, the fingerprint authentication apparatus 100 can reduce a case where a normal user is falsely recognized as being not a normal user, thereby being capable of enhancing operability. When the condition of the finger becomes good compared to the condition during the registration, the fingerprint authentication apparatus 100 determines a number of accepted fingers, which is smaller than the number of accepted fingers set during the registration, and determines the false acceptance rate so as to have equivalent authentication accuracy, based upon the history of the result of the authentication process. Consequently, the fingerprint authentication apparatus 100 prevents an application of extra load to the user, thereby being capable of enhancing operability.

Second Embodiment

[Configuration of Fingerprint Authentication Apparatus]

Figure 2:
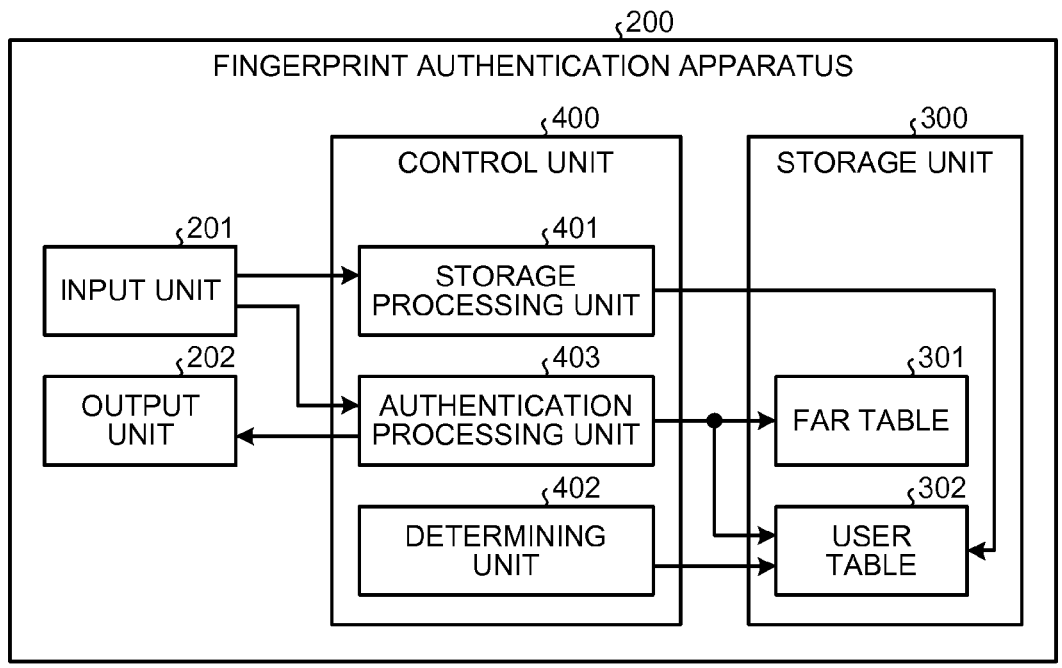
FIG. 2 is a block diagram illustrating one example of a configuration of a fingerprint authentication apparatus according to a second embodiment.

A fingerprint authentication apparatus 200 according to the second embodiment will be described. One example of the configuration of the fingerprint authentication apparatus 200 according to the second embodiment will be described with reference to FIG. 2. FIG. 2 is a block diagram illustrating one example of the configuration of the fingerprint authentication apparatus according to the second embodiment. As illustrated in FIG. 2, the fingerprint authentication apparatus 200 includes an input unit 201, an output unit 202, a storage unit 300, and a control unit 400.

The input unit 201 is connected to the control unit 400. The input unit 201 accepts fingerprint data of a user and various information, and inputs the accepted fingerprint data and various information to the control unit 400. A fingerprint sensor, keyboard, or mouse corresponds to the input unit 201, for example. The output unit 202 is connected to the control unit 400. The output unit 202 accepts various information from the control unit 400, and outputs the accepted various information. A display corresponds to the output unit 202, for example. The detail of the information or instruction accepted by the input unit 201, and the detail of the information outputted from the output unit 202 are not described here, but they will be described when the involved units are described.

The storage unit 300 is connected to the control unit 400. The storage unit 300 stores data used for various processes by the control unit 400. A semiconductor memory device such as RAM (Random Access Memory), ROM (Read Only Memory), or flash memory, a hard disk, or an optical disk corresponds to the storage unit 300. In the example in FIG. 2, the storage unit 300 includes an FAR (False Acceptance Rate) table 301, and a user table 302.

As illustrated in FIGS. 3A to 3D, the FAR table 301 stores a false acceptance rate in association with a number of accepted fingers, which is the number of fingers from which fingerprint data is accepted from the user during the authentication process, and a number of successful fingers, which is a number of fingers that succeed in collation requested for the successful authentication. The FAR table 301 also stores the false acceptance rate in association with a combination of the number of accepted fingers and the number of successful fingers, for each authentication accuracy by the fingerprint authentication apparatus 200. The false acceptance rate is used upon the collation. The authentication accuracy indicates accuracy in the authentication process by the fingerprint authentication apparatus 200. As described below, the authentication accuracy is determined by the number of accepted fingers, the number of successful fingers that is the number of fingers succeeding in the collation requested for the successful authentication, and the false acceptance rate.

FIGS. 3A to 3D are views for describing one example of the information stored in the FAR table in the second embodiment. FIG. 3A is a view for describing the FAR table when the authentication accuracy by the fingerprint authentication apparatus is 1/1000. FIG. 3B is a view for describing the FAR table when the authentication accuracy by the fingerprint authentication apparatus is 1/1000. FIG. 3C is a view for describing the FAR table when the authentication accuracy by the fingerprint authentication apparatus is 1/1000. FIG. 3D is a view for describing the FAR table when the authentication accuracy by the fingerprint authentication apparatus is 1/1000.

In FIGS. 3A to 3D, "2 fingers succeed in collation" and "3 fingers succeed in collation" respectively indicate that the numbers of successful fingers are "2" and "3". Further, "2 fingers now in collation" to "6 fingers now in collation" respectively indicate that the numbers of accepted fingers are "2" to "6". In the examples in FIGS. 3A to 3D, the number of successful fingers is "2" or "3", and the number of accepted fingers is "2" to "6". However, the invention is not limited thereto. For example, the number of accepted fingers may be "7" or more, and the number of successful fingers may be "4" or more.

In the description below, an index finger, a middle finger, and an annular finger of a right hand, and an index finger, a middle finger, and an annular finger of a left hand are used as the fingers from which the fingerprint data is accepted, unless otherwise specified. However the present invention is not limited thereto. For example, a thumb or little finger of a right hand, or a thumb or little finger of a left hand may be used. Alternatively, any one of the index finger, middle finger, and annular finger of the right hand may not be used, and any one of the index finger, middle finger, and annular finger of the left hand may not be used.

The FAR table 301 will further be described with reference to FIG. 3A. As illustrated in FIG. 3A, the FAR table 301 stores the false acceptance ratio "1/122" in association with the combination of the "2 fingers succeed in collation" and the "6 fingers now in collation". Specifically, the FAR table 301 stores that, when the false acceptance rate is "1/122", the authentication accuracy is 1/1000, in case where the number of accepted fingers is "6", and the number of successful fingers is "2". In other words, when the fingerprint data is accepted from six fingers, the collation is made by using the false acceptance rate of "1/122" for each fingerprint data, and the number of successful fingers is "2", the accuracy in the fingerprint authentication by the fingerprint authentication apparatus 200 becomes "1/1000". Similarly, as illustrated in FIG. 3A, the FAR table 301 stores the false acceptance rates by which the authentication accuracy by the fingerprint authentication apparatus 200 becomes 1/1000 for all combinations of the number of accepted fingers and the number of successful fingers. As illustrated in FIGS. 3B to 3D, the FAR table 301 also stores the numbers of accepted fingers, the numbers of successful fingers, and the false acceptance rates for other authentication accuracies.

The values illustrated in FIGS. 3A to 3D are determined by a binominal distribution, for example. The binominal distribution indicates a distribution of probability in which a certain phenomenon occurs "i" times. When a probability ρ in which a certain phenomenon occurs is executed "n" times independently, the probability in which the certain phenomenon occurs "i" times is in accordance with an (equation 1).

$$p(i) = \frac{n!}{i!(n-i)!} \cdot \rho^i \cdot (1-\rho)^{n-i} \qquad (1)$$

When the binominal distribution is applied to the authentication process by the fingerprint authentication apparatus 200 according to the second embodiment, n indicates the number of accepted fingers in the (equation 1). ρ indicates the false acceptance rate. i indicates the number of successful fingers. Here, the false acceptance rate indicates the probability that a person other than the user is accepted as the user. In other words, it indicates the probability that a user who is not the normal user succeeds in the collation. Therefore, P(i) indicates the probability that the user other than the normal user succeeds in the authentication under the condition that the number of accepted fingers is "n", the number of successful fingers is "i", and the false acceptance rate is "ρ". The person other than the normal user means a person who pretends to be someone, for example. In the description below, the person other than the normal user is also referred to as a third party with malice.

The case where the false acceptance rate is "1/100", and the number of accepted fingers is "6" will further be described with reference to FIG. 4A. FIG. 4A is a view for describing a relationship among the number of successful fingers, the false acceptance rate, and the authentication accuracy. "i" in FIG. 4A indicates the number of successful fingers. "P (%)" in FIG. 4A is the probability calculated in accordance with the (equation 1) by using the false acceptance rate "1/100", the number of accepted fingers "6", and "i" in FIG. 4A. Specifically, "P (%)" corresponding to "0" in FIG. 4A indicates the probability that the third party with malice succeeds in the collation for 0 finger. "P (%)" corresponding to "1" in FIG. 4A indicates the probability that the third party with malice succeeds in the collation for 1 finger. In other words, it indicates the probability that the fingerprint authentication apparatus 200 falsely authenticate once. Specifically, "P (%)" corresponding to "1" in FIG. 4A indicates the probability that the third party with malice is authenticated under the condition in which the false acceptance rate is "1/100", the number of accepted fingers is "6", and the number of successful fingers is "1".

Whether the value calculated by the binominal distribution is correct or not will briefly be confirmed, taking the case where the number of successful fingers is "6" as an example. In the case where the number of successful fingers is "6", the probability that the third party with malice succeeds in the collation for 6 fingers is indicated. As illustrated in i"6" in FIG. 4A, the probability that the third party with malice succeeds in the collation for 6 fingers is "0.0000000001" according to the binominal distribution.

The probability that the third party with malice succeeds in the collation for 6 fingers can also be calculated by raising the probability of the success in the collation for each finger to the $6^{th}$ power. Specifically, the probability that the third party with malice succeeds in the collation for 0.6 fingers becomes "(1/100)×(1/100)×(1/100)×(1/100)×(1/100)×(1/100)=1/10 billion". In other words, it is found that the value calculated from the binominal distribution is correct.

As illustrated in FIG. 4A, the probability sharply reduces, as the number of successful fingers increases. The probability that the third party with malice succeeds in the collation once is "5.7059402994". On the other hand, the probability that the third party with malice succeeds in the collation for 3 or more fingers is the total value of "P (%)" corresponding to i"3" to i"6". Specifically, the probability that the third party with malice succeeds in the collation for 3 or more fingers becomes "(0.001940598%+0.0000147015%+0.0000000594%+0.0000000001%)≈0.00195%≈1/50000". Specifically, the probability that the collation is successful for 3 or more fingers becomes smaller than the probability that the collation is successful once.

Similarly, the case where the false acceptance rate "1/60" and the number of accepted fingers "6" are used will further be described with reference to FIG. 4B. FIG. 4B is a view for describing a relationship among the number of successful fingers, the false acceptance rate, and the authentication accuracy. "i" in FIG. 4B indicates the number of successful fingers. "P (%)" in FIG. 4B is the probability calculated in accordance with the (equation 1) by using the false acceptance rate "1/60", the number of accepted fingers "6", and "i" in FIG. 4B. As illustrated in FIG. 4B, the probability sharply reduces, as the number of successful fingers increases. As illustrated in FIG. 4B, the probability that the third party with malice succeeds in the collation for 3 or more fingers becomes "(0.0088039695%+0.0001119149%+0.0000007587%+0.0000000021%)≈0.00891665%≈1/1000". In other words, even if the false acceptance rate is relatively large such as "1/60", the authentication accuracy becomes "1/1000" by setting the number of accepted fingers to "6" and the number of successful fingers to "3".

It is found from the above that it is difficult to generate a situation in which the third party with malice succeeds in the collation plural times, even if the false acceptance rate is relatively large. Specifically, according to the equation of the binominal distribution, the authentication accuracy can be enhanced by increasing the number of successful fingers. In other words, when equivalent authentication accuracy is kept, the false acceptance rate can be decreased by increasing the number of successful fingers.

It is also found from FIGS. 3A to 3D that, when equivalent authentication accuracy is kept, the false acceptance rate can be increased by decreasing the number of successful fingers according to the equation of the binominal distribution. This is because it is considered that the third party with malice is more difficult to succeed in the collation for 3 fingers out of 5 fingers than to succeed in the collation for 3 fingers out of 6 fingers. In the case where the third party succeeds in the collation for 3 fingers out of 6 fingers, the third party with malice can try the collation process six times, while in the case where the third party succeeds in the collation for 3 fingers out of 5 fingers, the third party with malice can try the collation process only five times.

Specifically, it is found that, when the number of accepted fingers, the number of successful fingers, and the false acceptance rate are determined with the authentication accuracy being equivalent, the false acceptance rate can be increased by increasing the number of successful fingers. Similarly, it is found that the false acceptance rate can be increased by decreasing the number of accepted fingers. By increasing the number of successful fingers, the false acceptance rate can be reduced with the authentication accuracy being kept to be high, whereby the fingerprint authentication of this type can be applied to a person with rough hand. By decreasing the number of accepted fingers, the false acceptance rate can be kept down with the authentication accuracy being kept to be high, whereby the fingerprint authentication of this type can be applied to a person with rough hand. Further, this process can reduce the load of the user for inputting the fingerprint data.

As described later, the fingerprint authentication apparatus 200 according to the second embodiment focuses on the relationship among the number of accepted fingers, the number of successful fingers, the false acceptance rate, and the authentication accuracy, and determines the number of fingers, the false acceptance rate, and the number of successful fingers used in the subsequent authentication in order that the authentication accuracy becomes equivalent. As a result, the fingerprint authentication apparatus 200 can keep high accuracy in the fingerprint authentication, and can enhance operability.

The user table 302 stores the fingerprint data for plural fingers, and stores the history of the result of the authentication process. The user table 302 is also referred to as a "fingerprint storage unit" or "history storage unit". One example of the information stored in the user table 302 according to the second embodiment will be described with reference to FIG. 5. FIG. 5 is a view for describing one example of the information stored in the user table 302 according to the second embodiment.

As illustrated in FIG. 5, the user table 302 stores an "achievement FAR", "collation frequency", "success frequency", "number of accepted fingers", and "number of successful fingers" in association with a "user name" or "user ID" for identifying a user. The "achievement FAR" indicates the authentication accuracy. The "collation frequency" indicates the number of times of executing the authentication process. The "success frequency" indicates the number of times of the successful authentication. In the description below, the case where the achievement FAR is "1/1000" will be described, unless otherwise specified. Specifically, the case where the accuracy of "1/1000" is intended to be kept in the authentication process will be described.

As illustrated in FIG. 5, the user table 302 stores "use", "success rate", and "registered fingerprint data" for each finger in association with the "user name" or "user ID". As illustrated in FIG. 5, the user table 302 also stores the "use", "success rate", and "registered fingerprint data" for each of "index finger of right hand", "middle finger of right hand", "annular finger of right hand", "index finger of left hand", "middle finger of left hand", and "annular finger of left hand". In the information stored in the user table 302, the "collation frequency", "success frequency", and "success rate" correspond to the history of the result of the authentication process. The "success rate" is also referred to as "the rate of the successful collation" or "success rate of collation".

In FIG. 5, the "use" indicates whether the finger is the one from which fingerprint data is accepted from the user or not, as described later. In the example in FIG. 5, "O" in the use indicates the finger from which fingerprint is accepted from the user, while "X" in the use indicate that the finger is not the one from which fingerprint is accepted from the user. The "success rate" indicates the probability that the collation is successful. The "registered fingerprint data" indicates whether the fingerprint is registered or not as described later. In the example in FIG. 5, "YES" in the registered fingerprint data indicates that the fingerprint is registered, so that the user table 302 stores the fingerprint data. "NO" in the registered fingerprint data indicates that the fingerprint data is not registered.

For example the user table 302 stores the achievement FAR of "1/1000", the collation frequency of "286", the success frequency of "216", the number of accepted fingers of "5", and the number of successful fingers "3", in association with the user name "Yamada" or user ID of "yamada". Specifically, the user table 302 stores that the accuracy in the authentication process is "1/1000", that the authentication process is executed "286" times, and that the authentication is successful "216" times, for the user "Yamada". The user table 302 also stores that, when the authentication process is executed, the number of accepted fingers is "5", and the number of successful fingers is "3" for the user "Yamada". Specifically, the user table 302 stores that, when the authentication process is executed for the user ID "yamada", the fingerprint data is accepted from 5 fingers, and the authentication is determined to be successful if the collation is successful for 3 or more fingers.

One example of the information for the user "Yamada" stored in the user table 302 will further be described with reference to FIG. 5. In the example in FIG. 5, the user table 302 stores "X" in the use, "0/0=0%" in the success rate, and "NO" in the registered fingerprint data for the index finger of the right hand in association with the user name "Yamada" or user ID "yamada". Specifically, the user table 302 stores that the fingerprint data of the index finger of the right hand is not accepted, and that the success rate of collation is "0%" as a result of the collation process executed 0 time for the index finger of the right hand, and as a result of 0 successful collation, for the user "Yamada". The user table 302 also stores that the fingerprint data of the index finger of the right hand is not registered for the user "Yamada".

In the example in FIG. 5, the user table 302 also stores "O" in the use, "192/286=67%" in the success rate, and "YES" in the registered fingerprint data for the middle finger of the right hand in association with the user name "Yamada" or user ID "yamada". Specifically, the user table 302 stores that the fingerprint data of the middle finger of the right hand is accepted, and that the success rate of collation is "67%" as a result of the collation process executed 286 time for the middle finger of the right hand, and as a result of 192 successful collations, for the user "Yamada". The user table 302 also stores that the fingerprint data of the middle finger of the right hand is registered for the user "Yamada".

The user table 302 similarly stores the "use", "success rate", and the "registered fingerprint data" for other fingers for the user "Yamada". The user table 302 similarly stores the information for other users.

In the data stored in the user table 302, the "user name", "user ID", "registered fingerprint data", and "achievement FAR" are inputted by a storage processing unit 401 of the control unit 400, for example. In the data stored in the user table 302, the "collation frequency", "success frequency", and "success rate" are inputted by the authentication processing unit 403 of the control unit 400. In the data stored in the user table 302, the "number of accepted fingers" and "number of successful fingers" are inputted by the storage processing unit 401 or determining unit 402 of the control unit 400.

The control unit 400 is connected to the input unit 201, the output unit 202, and the storage unit 300. The control unit 400 has internal memory that stores a program specifying various procedures, thereby controlling various processes. The control unit 400 is an electronic circuit such as ASIC (Application Specific Integrated Circuit), FPGA (Field Programmable Gate Array), CPU (Central Processing Unit), and MPU (Micro Processing Unit). In the example in FIG. 2, the control unit 400 includes the storage processing unit 401, the determining unit 402, and the authentication processing unit 403.

The storage processing unit 401 accepts the fingerprint data of the user from the input unit 201. Specifically, the storage processing unit 401 accepts plural fingerprint data for each of plural fingers of the user. The storage processing unit 401 then calculates the degree of correlation among the plural accepted fingerprint data for each of plural fingers of the user, and stores the finger from which the degree of correlation not less than a threshold value is calculated in the user table 302. The detail of the process by the storage processing unit 401 will be described with reference to FIG. 8, so that the detailed description will not be made here. The storage processing unit 401 is also referred to as "calculating unit" or "storage unit".

The determining unit 402 determines the number of successful fingers, the number of accepted fingers, and the false acceptance rate in order that the authentication accuracy determined by the number of successful fingers, the number of accepted fingers, and the false acceptance rate becomes equivalent, based upon the history of the result of the authentication process stored in the user table 302. Specifically, when the number of accepted fingers is large, the determining unit 402 determines the larger false acceptance rate, compared to the case where the number of accepted fingers is small. On the other hand, when the number of accepted fingers is small, the determining unit 402 determines the smaller false acceptance rate, compared to the case where the number of accepted fingers is large. When the number of successful fingers is large, the determining unit 402 determines the larger false acceptance rate compared to the case where the number of successful fingers is small. On the other hand, when the number of successful fingers is small, the determining unit 402 determines the smaller false acceptance rate, compared to the case where the number of successful fingers is large.

The case where the determining unit 402 determines the number of accepted fingers and the number of successful fingers will be described below. In the description below, the false acceptance rate is uniquely determined based upon the FAR table 301, and the number of accepted fingers and the number of successful fingers determined by the determining unit 402. The process of the determining unit 402 will be described below for five types. One example of a process flow by the determining unit 402 will be described later with reference to FIGS. 10 and 11, so that it will not be described here.

(Type 1) Case where a finger with low success rate of collation is present
(Type 2) Case where there are 2 fingers with high success rate of collation compared to the other fingers
(Type 3) Case where 2 fingers with high success rate of collation stably succeed in collation
(Type 4) Case where 2 fingers with high success rate of collation becomes unstable
(Type 5) Case where success rate of authentication is 50% or less The (Type 1) will be described. The determining unit 402 calculates the success rate of collation for each finger by referring to the user table 302, and excludes the finger having the calculated success rate of collation lower than a threshold value from the fingers from which fingerprint data is accepted from the user. For example, the determining unit 402 changes the use from "O" to "X" for the finger having the calculated success rate of collation lower than the threshold value in the data stored in the user table 302, and decreases the number of accepted fingers by "1". In other words, the determining unit 402 determines the number of successful fingers, the number of accepted fingers, and the false acceptance rate in order that the number of accepted fingers is decreased by "1" with the authentication accuracy being kept equivalent.

For example, the determining unit 402 determines whether or not there is a finger having the success rate lower than that of the other fingers by 10% or more. When the determining unit 402 determines that there is the finger described above, it excludes the finger having the success rate lower than that of the other fingers by 10% or more. For example, the determining unit 402 calculates the success rate of collation for each finger, and excludes one finger with the lowest success rate. As a result, the number of accepted fingers decreases by 1, and the false acceptance rate increases as indicated by arrows in FIG. 6A. FIG. 6A is a view for describing the (Type 1) in the determining process by the determining unit according to the second embodiment. In FIGS. 6A to 6E, the base of the arrow indicates the number of successful fingers, the number of accepted fingers, and the false acceptance rate before the determination. In FIGS. 6A to 6E, the point of the arrow indicates the number of successful fingers, the number of accepted fingers, and the false acceptance rate after the determination. The case where the finger having the success rate lower than that of the other fingers by 10% or more is excluded has been described above. However, the present invention is not limited thereto. Any value may be applied.

The finger with the poor success rate of collation does not contribute to the successful authentication, even if the fingerprint data is inputted. In light of this, the determining unit 402 excludes the finger with the lower success rate of collation than that of the other fingers from the fingers from which fingerprint data is accepted from the user. As a result, the number of accepted fingers decreases, and the false acceptance rate increases as indicated by the arrows as illustrated in FIG. 6A. Specifically, since the finger that does not contribute much to the successful authentication is excluded from the subjects to be collated, the number of the fingers from which the fingerprint data is extracted decreases, whereby the operability of the normal user is enhanced. Since the number of accepted fingers decreases, the false acceptance rate used for the collation process increases, whereby the possibility that the normal user succeeds in the authentication can be increased with the achievement FAR being kept equivalent. The finger from which the fingerprint data is accepted from the user is also referred to as "subject to be collated" below.

The (Type 2) will be described. The determining unit 402 calculates the success rate for each finger by referring to the user table 302, and determines whether or not there are 2 or more fingers having the calculated success rate of collation higher than the threshold value. For example, the determining unit 402 determines whether or not there are 2 or more fingers having the success rate of collation higher than that of the other fingers by 20% or more. When the determining unit 402 determines there are those fingers, the determining unit 402 decreases the number of successful fingers as illustrated in FIG. 6B. Specifically, the determining unit 402 decreases the number of successful fingers by "1" so as to make the number of successful fingers close to "2" in the user table 302. In other words, the determining unit 402 determines the number of successful fingers, the number of accepted fingers, and the false acceptance rate in order that the number of successful fingers is decreased by "1" with the authentication accuracy being kept equivalent. FIG. 6B is a view for describing the (Type 2) in the determining process by the determining unit according to the second embodiment. The case where it is determined whether or not there are 2 or more fingers having the success rate higher than that of the other fingers by 20% or more has been described above. However, the present invention is not limited thereto. Any value may be applied.

As the number of accepted fingers is small, the labor of the user for inputting the fingerprint data is reduced, whereby the operability is enhanced. Here, the number of accepted fingers cannot be set to be less than the number of successful fingers. In light of this, when there are 2 or more fingers having the success rate higher than the threshold value, the number of successful fingers is decreased in anticipation of these 2 fingers continuously succeeding in authentication. As a result, the maximum number of decreasing the number of accepted fingers can be increased in the (Type 1).

The (Type 3) will be described. The determining unit 402 refers to the user table 302 for determining whether or not 2 fingers with the high success rate of collation stably succeed in the collation. For example, the determining unit 402 acquires the success rate of collation, every time it refers to the user table 302, and it stores the acquired success rate of collation into the memory of the determining unit 402. The determining unit 402 then identifies the manner of change in the success rate of collation stored in the memory so as to determine whether the success rate of collation is decreased or not. With this determination, the determining unit 402 determines whether or not the 2 fingers stably succeed in the collation. When the determining unit 402 determines that the 2 fingers stably succeed in the collation, it decreases the number of accepted fingers by "1" as illustrated in FIG. 6C. In other words, the determining unit 402 determines the number of successful fingers, the number of accepted fingers, and the false acceptance rate in order that the number of accepted fingers is decreased by "1" with the authentication accuracy being kept equivalent. Specifically, the determining unit 402 changes the use from "O" to "X" for one of 2 fingers having high success rate of collation in the data stored in the user table 302, and decreases the number of accepted fingers by "1". FIG. 6C is a view for describing the (Type 3) in the determining process by the determining unit according to the second embodiment.

Specifically, if the fingers with the high success rate of collation stably succeed in the collation, it is meaningless that the fingerprint data of the other fingers is used. In light of this, the determining unit 402 excludes, from the subjects to be collated, the finger with the lowest success rate out of the fingers other than the fingers stably succeeding in the collation. As a result, as in the (Type 1), the number of the fingers from which the fingerprint data is extracted decreases, whereby the operability of the normal user is enhanced. As in the (Type 1), since the number of accepted fingers decreases, the false acceptance rate used for the collation process increases, whereby the possibility that the normal user succeeds in the authentication can be increased with the achievement FAR being kept equivalent.

The (Type 4) will be described. The determining unit 402 refers to the user table 302 for determining whether or not 2 fingers with the high success rate of collation become unstable. For example, the determining unit 402 stores the success rate of collation into the memory of the determining unit 402 as in the (Type 3). The determining unit 402 then identifies the manner of change in the success rate of collation stored in the memory so as to determine whether the success rate of collation is decreased or not. With this determination, the determining unit 402 determines whether the 2 fingers are unstable or not. When the determining unit 402 determines that the 2 fingers become unstable, it increases the number of successful fingers as illustrated in FIG. 6D. For example, the determining unit 402 increases the number of successful fingers by "1" in the data stored in the user table 302. In other words, the determining unit 402 determines the number of successful fingers, the number of accepted fingers, and the false acceptance rate in order that the number of successful fingers is increased by "1" with the authentication accuracy being kept equivalent. FIG. 6D is a view for describing the (Type 4) in the determining process by the determining unit according to the second embodiment.

Examples of the causes that lead to the 2 fingers with the high success rate being unstable include an injury on the finger. In this case, the determining unit 402 increases the number of successful fingers so as to increase the false acceptance rate, by which the user is easy to succeed in the authentication. In this case, the determining unit 402 may increase the number of accepted fingers.

The (Type 5) will be described. The determining unit 402 calculates the rate of the success of the user in the authentication by referring to the user table 302, and determines whether the calculated rate is less than the threshold value or not. When the determining unit 402 determines that the rate is less than the threshold value, it increases the number of accepted fingers. The rate of success of the user in the authentication is also referred to as "success rate of authentication". For example, the determining unit 402 calculates the success rate of authentication by dividing the success frequency in the user table 302 by the collation frequency. When the rate of the user being authenticated is 50% or less, the determining unit 402 increases the number of accepted fingers by "1" as illustrated in FIG. 6E. For example, the determining unit 402 changes the use from "X" to "O" for one of 2 fingers whose use is "X" in the data stored in the user table 302, and increases the number of accepted fingers by "1". FIG. 6E is a view for describing the (Type 5) in the determining process by the determining unit according to the second embodiment.

When the rate that the user is authenticated is less than the threshold value, it is likely that the authentication process is not done well, and the number of accepted fingers or the number of successful fingers, or the setting of the finger from which fingerprint data is accepted from the user, is not appropriate. In light of this, the determining unit 402 increases the number of accepted fingers by "1". As a result, the false acceptance rate is reduced, since the number of accepted fingers increases by "1". However, when the success rate of the finger from which fingerprint data is newly accepted is good, the success rate dramatically increases. For example, this process is effective for the case where the injured finger is excluded from the subjects to be collated, and this finger is healed. When the newly added finger less succeeds in the collation in the subsequent process, it is excluded by the process in the (Type 1).

In the (Type 1) to (Type 5), the determining unit 402 calculates the success rate of collation for each finger by referring to the user table 302, and as a certain finger has high calculated success rate of collation, this finger is preferentially determined as the finger from which fingerprint data is accepted from the user. Specifically, when the number of accepted fingers increases, the determining unit 402 adds the finger having the highest success rate of collation out of the fingers that are not accepted. On the other hand, when the number of accepted fingers decreases, the determining unit 402 excludes the finger with the lowest success rate of collation out of the accepted fingers. Although not illustrated in FIG. 6C, when one of 2 fingers having excellent degree of coincidence also succeeds in the collation even if the false acceptance rate is "1/1000", the process is changed to "1 finger collation".

The authentication processing unit 403 accepts the fingerprint data from the finger in the number of accepted fingers determined by the determining unit 402. The authentication processing unit 403 then collates whether or not each of the accepted fingerprint data coincides with the fingerprint data stored in the user table 302 by using the false acceptance rate determined by the determining unit 402. The authentication processing unit 403 then authenticates the user based upon the result of the collation.

Specifically, when the authentication processing unit 403 accepts the user ID, it searches the user table 302 by using the accepted user ID as a search key, thereby acquiring the achievement FAR, the number of successful fingers, the number of accepted fingers, and "use" or fingerprint data for each finger. The authentication processing unit 403 then selects the table in the FAR table 301 by using the achievement FAR as the search key. The authentication processing unit 403 acquires the false acceptance rate by using the acquired number of successful fingers and the number of accepted fingers as the search key in the selected table. The authentication processing unit 403 then executes the authentication process by using the acquired false acceptance rate, the number of successful fingers, the number of accepted fingers, the fingerprint data, and the fingerprint data accepted from the user. The detail of the authentication processing unit 403 will be described with reference to FIG. 9, so that it will not be described here.

The fingerprint authentication apparatus 200 may be realized by using an information processing apparatus such as an existing personal computer, a cellular phone, a PHS (Personal Handyphone System) terminal, a mobile communication terminal, or a PDA (Personal Digital Assistant). For example, the fingerprint authentication apparatus 200 may be realized by mounting the functions of the FAR table 301, the user table 302, the storage processing unit 401, the authentication processing unit 403 and the determining unit 402 illustrated in FIG. 2 to the information processing apparatus such as the PDA.

[Process by Storage Processing Unit]

Figure 7:
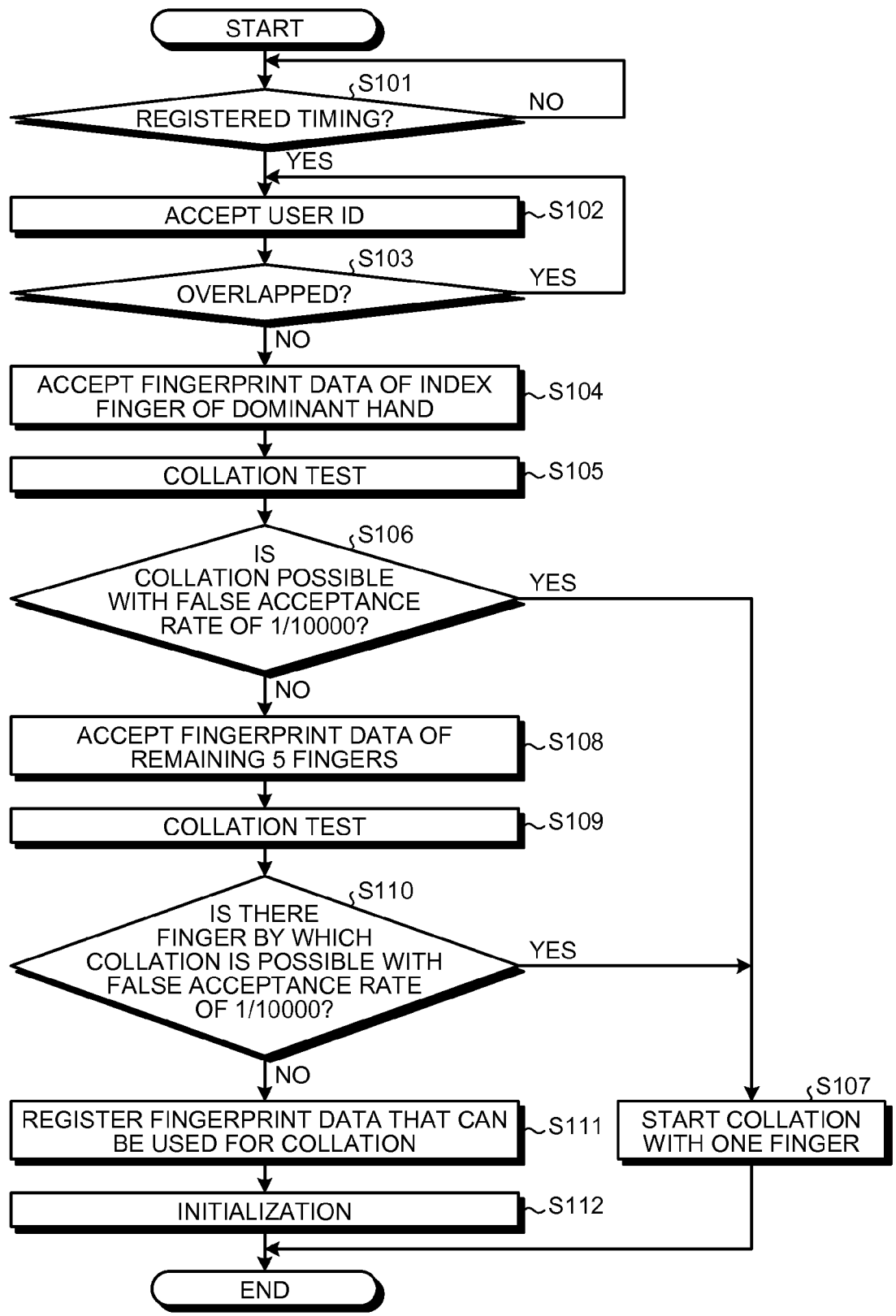
FIG. 7 is a flowchart illustrating one example of a flow of a process by a storage processing unit according to the second embodiment.

Next, one example of a flow of a process by the storage processing unit 401 according to the second embodiment will be described with reference to FIG. 7. FIG. 7 is a flowchart illustrating one example of the flow of the process by the storage processing unit according to the second embodiment.

As illustrated in FIG. 7, the storage processing unit 401 accepts the user ID (step S102) upon the timing when the fingerprint data is registered to the user table 302 (Yes in step S101). For example, when receiving the instruction indicating that the fingerprint data is registered to the user table 302 from the user "Yamada", the storage processing unit 401 accepts the user ID "yamada".

The storage processing unit 401 determines whether or not the accepted user ID and the user ID that has already been registered to the user table 302 are overlapped with each other (step S103). For example, the storage processing unit 401 determines whether they are overlapped or not by identifying whether the user table 302 stores the user ID "Yamada". When the storage processing unit 401 determines that they are overlapped (Yes in step S103), it accepts again the user ID (step S102), and repeats the process until it determines that they are not overlapped.

On the other hand, when the storage processing unit 401 determines that they are not overlapped (No in step S103), it accepts the fingerprint data of an index finger of a dominant hand (step S104). Specifically, the storage processing unit 401 accepts plural fingerprint data from the index finger of the dominant hand. The reason why the storage processing unit 401 accepts the fingerprint data of the index finger of the dominant hand is because the index finger of the dominant hand is the finger that the user is easy to offer the fingerprint data. In other words, the index finger of the dominant hand is the finger from which the fingerprint data is easy to be accepted from the user. For example, the index finger of the dominant hand is the finger that is easy to be in contact with the fingerprint sensor by the user.

The storage processing unit 401 then executes the collation test (step S105). Specifically, the storage processing unit 401 calculates the degree of correlation among accepted plural fingerprint data. Then, the storage processing unit 401 determines whether or not the collation process can be executed with the false acceptance rate of "$1/1000$" (step S106). Specifically, for example, the storage processing unit 401 executes the collation process among the accepted plural fingerprint data, and determines whether or not the collation process can be executed for one finger by using the achievement FAR. When the storage processing unit 401 determines that the collation process can be executed (Yes in step S106), it starts the collation by using one finger (step S107). Specifically, the fingerprint authentication apparatus 200 executes the authentication process by using the false acceptance rate of "$1/1000$" by use of the index finger of the dominant hand afterward. In this case, the storage processing unit 401 registers to the user table 302 the user "Yamada", the user ID "yamada", the number of accepted fingers of "1", and the number of successful fingers of "1". The storage processing unit 401 registers the use of "O" and the registered fingerprint data of "YES" for the index finger of the right hand, for example.

On the other hand, when the storage processing unit 401 determines that the collation process cannot be executed (No in step S106), it accepts the plural fingerprint data for each of the remaining 5 fingers (step S108). Then, the storage processing unit 401 executes the collation test for each finger (step S109). The storage processing unit 401 determines whether or not there is the finger that succeeds in the collation even by using the false acceptance rate of "$1/1000$" (step S110). When determining that there is the finger used for the collation process (Yes in step S110), it executes the authentication process by using the false acceptance rate of "$1/1000$" by use of one finger that is determined to be capable of being used for the collation process (step S107). Specifically, when the storage processing unit 401 determines that the middle finger of the right hand succeeds in the collation even by using the false acceptance rate of "$1/1000$", the fingerprint authentication apparatus 200 executes the authentication process by using the false acceptance rate of "$1/1000$" by use of the middle finger of the right hand afterward.

On the other hand, when the storage processing unit 401 determines that there is no finger that can be used for the collation process (No in step S110), it registers the fingerprint data, which can be used for the collation, to the user data (step S111). Specifically, the storage processing unit 401 registers the finger for which the degree of correlation not less than the threshold value is calculated in the collation test in the above-mentioned steps S105 and S109, to the user table 302. Specifically, the storage processing unit 401 does not register the accepted fingerprint data that is poor, and that cannot be used for the later-described authentication process. In other words, it registers all fingers, excluding the finger that cannot be used at all for the collation, to the user table 302. For example, the storage processing unit 401 does not register the fingerprint data accepted for the index finger of the right hand to the user table 302, if the collation is not successful unless the value larger than the false acceptance rate of "$1/10$" is used. Alternatively, in case where the fingerprint data succeeds in collation if the false acceptance rate not more than "$1/10$" is used, the storage processing unit 401 registers this fingerprint data to the user table 302. Here, the case where the fingerprint data is registered or not by using the false acceptance rate of "$1/10$" as the reference value is described above, but the invention is not limited thereto. For example, a value larger than the false acceptance rate of "$1/10$" may be used as the reference value, or a value smaller than the false acceptance rate of "$1/10$" may be used as the reference value.

The storage processing unit 401 registers the initial setting to the user table 302 (step S112). For example, the storage processing unit 401 registers the number of fingerprint data registered to the user table 302 as the number of accepted fingers, i.e., registers the number of fingers whose fingerprint data is registered. The storage processing unit 401 also registers "3" as the number of successful fingers, for example. When registering the number smaller than "3" is registered as the number of accepted fingers, the storage processing unit 401 registers the number equal to the number of accepted fingers as the number of successful fingers.

The above-mentioned procedure is not limited to the order described above. The order of the procedure may be changed, as needed, within the range consistent with the content of the process. For example, the fingerprint data of all fingers of the user may be accepted in step S104. In this case, the steps S105 to S108 may be skipped.

[Process by Authentication Processing Unit]

Figure 8:
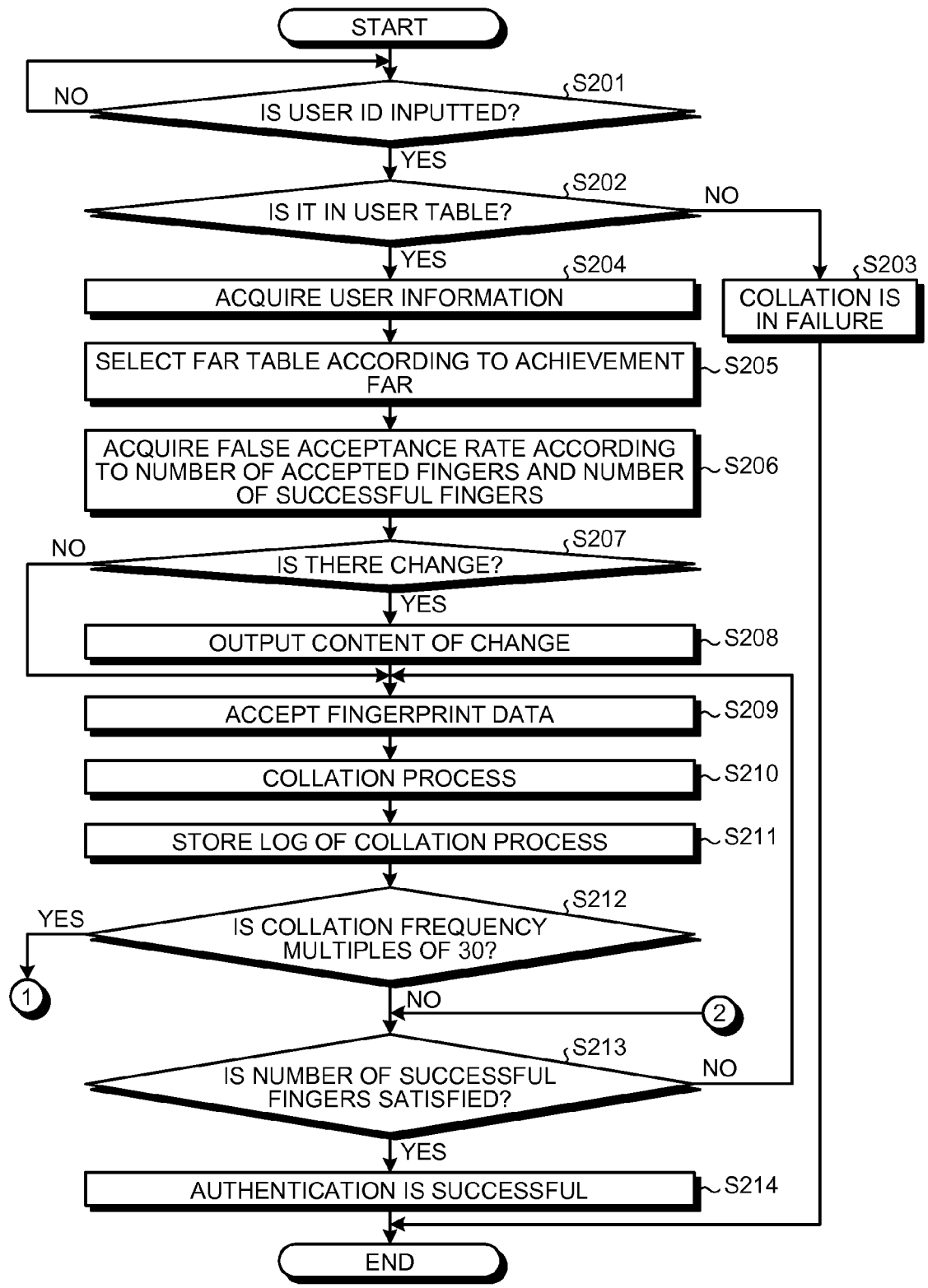
FIG. 8 is a flowchart illustrating one example of a flow of a process by an authentication processing unit 403 according to the second embodiment.
Figure 9:
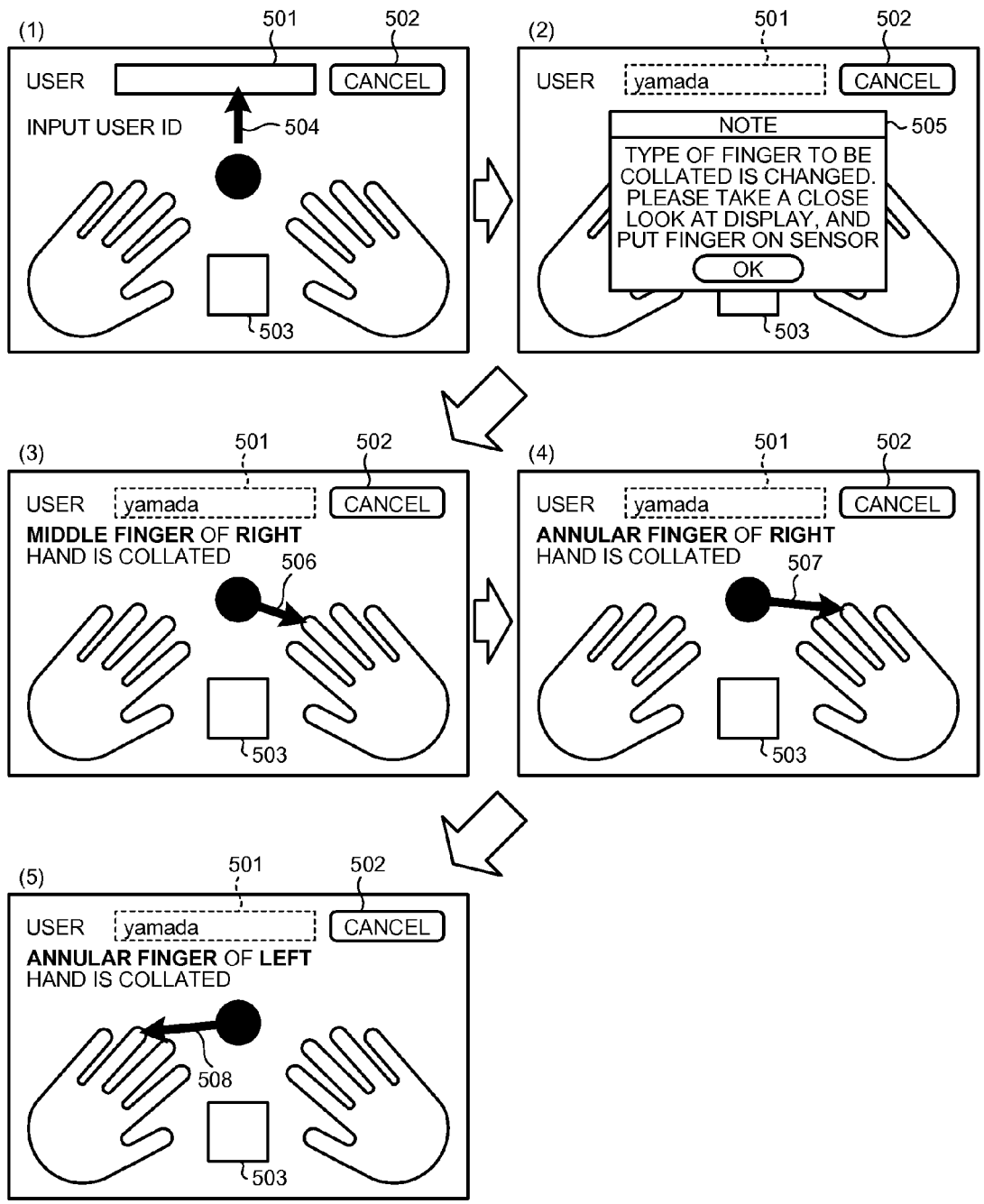
FIG. 9 is a view for describing the authentication processing unit according to the second embodiment.

Next, one example of the flow of the process by the authentication processing unit 403 according to the second embodiment will be described with reference to FIG. 8. FIG. 8 is a flowchart illustrating one example of the flow of the process by the authentication processing unit 403 according to the second embodiment. The process will be described below with reference to FIG. 9, as needed. FIG. 9 is a view for describing the authentication processing unit according to the second embodiment. FIGS. 9(1) to 9(5) illustrate examples of screens outputted to the user from the output unit 202 by the authentication processing unit 403. In FIG. 9, a field 501 accepts an input of the user ID. A field 502 accepts the instruction of canceling the authentication process from the user. A field 503 accepts the fingerprint data, and the fingerprint sensor corresponds to the field 503. Arrows 504, and 506 to 508 indicate a portion that urges the user to input. A dialog 505 informs the user of a message.

As illustrated in FIG. 9(1), the authentication processing unit 403 outputs the screen for accepting the input of the user ID. As illustrated in FIG. 9, the authentication processing unit determines whether the inputted user ID is present or not in the user table 302 (step S202), when the user ID is inputted (Yes in step S201). For example, when the user ID "yamada" is inputted to the field 501 in FIG. 9, the authentication processing unit 403 searches the user table 302 by using the user ID "yamada" as a search key so as to determine whether the user ID "yamada" is hit or not. When the authentication processing unit 403 determines that the user ID is not present in the user table 302 (No in step S202), it determines that the collation is in failure (step S203), and ends the process. When the collation is immediately determined to be in failure, the user ID might possibly be searched illegally. In light of this, the authentication processing unit 403 may pretend that it apparently makes the collation.

On the other hand, when determining that the user ID is present in the user table 302 (Yes in step S202), the authentication processing unit 403 acquires the user information from the user table 302 (step S204). For example, the authentication processing unit 403 acquires the achievement FAR "$1/1000$", the number of accepted fingers of "5", the number of successful fingers of "3", and the type of the finger accepted from the user for the user ID "yamada". The fingers accepted by the user are the fingers to which "O" is set to the use for the user ID "yamada" in the example in FIG. 5. Those fingers are the "middle finger of right hand", "annular finger of right hand", "index finger of left hand", "middle finger of left hand", and "annular finger of left hand".

Then, the authentication processing unit 403 selects the FAR table 301 according to the achievement FAR (step S205). Specifically, the authentication processing unit 403 selects the table for the achievement FAR of "$1/1000$" as illustrated in FIG. 3B.

The authentication processing unit 403 then acquires the false acceptance rate in accordance with the number of accepted fingers and the number of successful fingers (step S206). Specifically, the authentication processing unit 403 acquires the false acceptance rate "$1/46$" corresponding to the combination of the number of accepted fingers of "5" and the number of successful fingers of "3" in the selected FAR table 301. The false acceptance rate acquired by the authentication processing unit 403 is the value by which the achievement FAR assumes "$1/1000$" under the condition that the number of accepted fingers is "5", and the number of successful fingers is "3".

The authentication processing unit 403 then determines whether or not there is a change in the type of the finger from which the fingerprint data is accepted from the user or in the number of accepted fingers (step S207). For example, the authentication processing unit 403 stores the previous type of the finger and the previous number of accepted fingers for each user, and determines whether the type of the finger or the number of accepted fingers acquired this time is different or not from the previous type or the previous number of accepted fingers. The authentication processing unit 403 determines that there is a change (Yes in step S207), it outputs a message indicating that there is a change or the changed content as illustrated in the field 505 in FIG. 9(2) (step S208).

The authentication processing unit 403 accepts the fingerprint data from the user (step S209). For example, the authentication processing unit 403 accepts the fingerprint data from the "middle finger of right hand", "annular finger of right hand", "index finger of left hand", "middle finger of left hand", and "annular finger of left hand" of the user who inputs the user ID "yamada". As illustrated in FIGS. 9(3) to 9(5), the authentication processing unit 403 informs the user of the type of the finger whose fingerprint data is accepted. For example, the authentication processing unit 403 accepts one by one the fingerprint data from the index finger of the right hand. In the example indicated by the arrow 506 in FIG. 9(3), the authentication processing unit 403 informs the user of the state that the fingerprint data is accepted from the "middle finger of right hand", while in the example indicated by the arrow 507 in FIG. 9(4), the authentication processing unit 403 informs the user of the state that the fingerprint data is accepted from the "annular finger of right hand". In the example indicated by the arrow 508 in FIG. 9(5), the authentication processing unit 403 informs the user of the state that the fingerprint data is accepted from the "annular finger of left hand".

The authentication processing unit 403 executes the collation process (step S210). Specifically, the authentication processing unit 403 collates whether the accepted fingerprint data coincides with the stored fingerprint data or not by using the false acceptance rate determined by the determining unit 402. In this case, the authentication processing unit 403 executes the collation process for each finger by using the false acceptance rate of "$1/46$".

The authentication processing unit 403 stores the log of the collation process (step S211). Specifically, the authentication processing unit 403 increases the authentication frequency by "1" in the data stored in the user table 302, thereby updating the success rate for each finger to which the collation process is executed.

Then, the authentication processing unit 403 determines whether the collation frequency is multiples of 30 or not (step S212). When the authentication processing unit 403 determines that the collation frequency is the multiples of 30 (Yes in step S212), the determining unit 402 executes a series of processes described with reference to FIG. 10 or FIG. 11. In the example in FIG. 9, the determining unit 402 executes the process when the collation frequency is the multiples of 30. However, the present invention is not limited thereto. The process may be executed at any timing.

The authentication processing unit 403 then determines whether the number of successful fingers is satisfied or not (step S213). For example, the authentication processing unit 403 determines whether the collation is successful or not for 3 or more fingers. When determining that the number of successful fingers is satisfied (Yes in step S213), the authentication processing unit 403 determines that the authentication is successful (step S214). In this case, the authentication processing unit 403 increases the success frequency in the user table 302 by "1", for example. On the other hand, when the authentication processing unit 403 does not determine that the number of successful fingers is satisfied (No in step S213), it returns to the step S209, and repeats the processes in steps S209 to S213 until it determines that the number of successful fingers is satisfied.

The above-mentioned procedure is not limited to the order described above. The order of the procedure may be changed, as needed, within the range consistent with the content of the process. For example, the step S212 may be skipped. In this case, the collation frequency is monitored as a process independent of a series of processes in FIG. 9, whereby a series of processes illustrated in FIG. 10 or FIG. 11 is started.

[Process by Determining Unit]

One example of the flow of the process by the determining unit 402 according to the second embodiment will be described next with reference to FIG. 10. FIG. 10 is a flowchart illustrating one example of a flow of the process by the determining unit according to the second embodiment. The series of processes described below is executed, every time the collation frequency becomes the multiples of 30 as illustrated in step S212 in FIG. 9.

Figure 10:
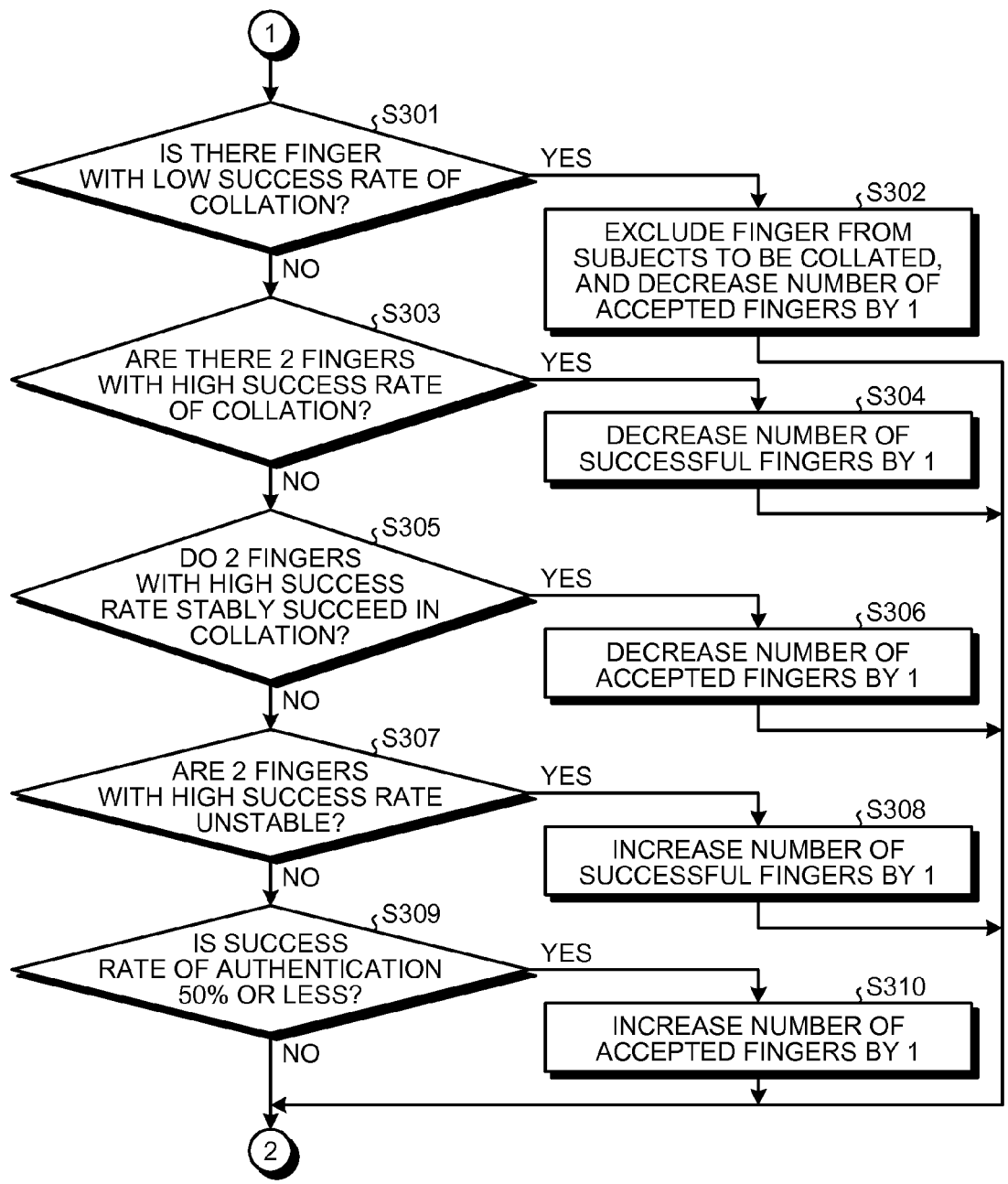
FIG. 10 is a flowchart illustrating one example of a flow of a process by the determining unit according to the second embodiment.
Figure 11:
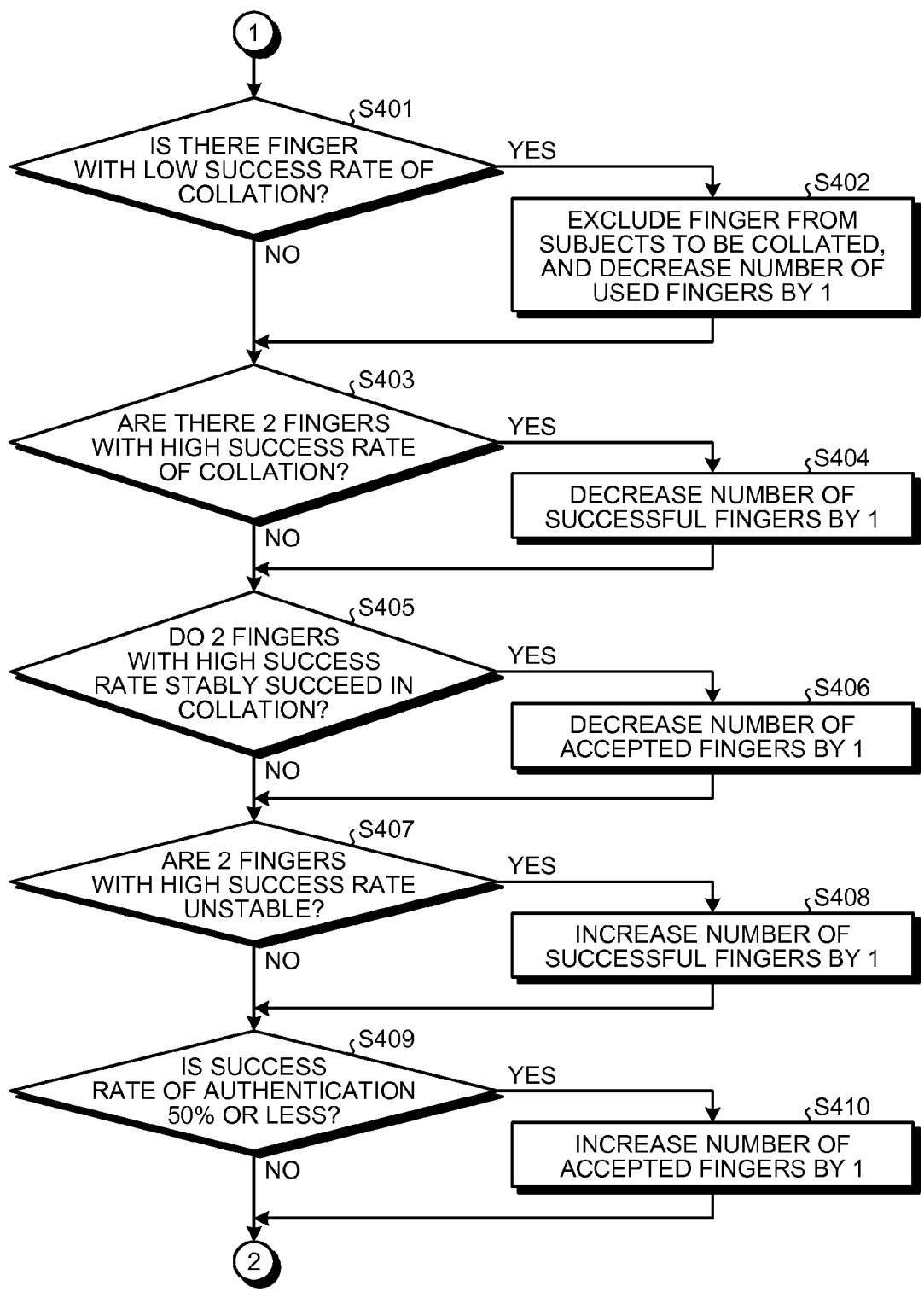
FIG. 11 is a flowchart illustrating one example of a flow of a process by the determining unit according to the second embodiment.

As illustrated in FIG. 10, the determining unit 402 determines whether or not there is a finger with the low success rate of collation (step S301). For example, the determining unit 402 determines whether or not there is a finger having the success rate lower than that of the other fingers by 10% or more. When determining that there is the finger with the low success rate of collation (Yes in step S301), the determining unit 402 excludes this finger from the subjects to be collated, and decreases the number of accepted fingers by 1 (step S302). Specifically, the determining unit 402 excludes the finger with the low success rate of collation from the fingers from which the fingerprint data is accepted from the user. Then, the determining unit 402 ends the process.

On the other hand, when determining that there is no finger with the low success rate of collation (No in step S301), the determining unit 402 determines whether or not there are 2 fingers with the high success rate of collation (step S303). For example, the determining unit 402 determines whether or not there are 2 or more fingers with the success rate higher than that of the other fingers by 20% or more. When determining that there are 2 fingers with the high success rate of collation (Yes in step S303), the determining unit 402 decreases the number of successful fingers by 1 (step S304), and ends the process.

On the other hand, when determining that there are not 2 fingers with the high success rate of collation (No in step S303), the determining unit 402 determines whether or not the 2 fingers with the high success rate of collation stably succeed in the collation (step S305). For example, the determining unit 402 acquires the success rate of collation every time it refers to the user table 302, and stores the acquired success rate of collation into the memory of the determining unit 402. The determining unit 402 identifies the manner of change in the success rate of collation stored in the memory so as to determine whether the success rate of collation is decreased or not. With this process, the determining unit 402 determines whether the 2 fingers stably succeed in the collation or not. When determining that the 2 fingers with the high success rate of collation stably succeed in the collation (Yes in step S305), the determining unit 402 decreases the number of accepted fingers by 1 (step S306). Then, the determining unit 402 ends the process.

On the other hand, when the determining unit 402 determines that the 2 fingers with the high success rate of collation do not stably succeed in the collation (No in step S305), it determines whether the 2 fingers with the high success rate of collation are unstable or not (step S307). For example, the determining unit 402 identifies the manner of change in the success rate of collation stored in the memory so as to determine whether the success rate of collation is decreased or not. With this process, the determining unit 402 determines whether the 2 fingers are unstable or not. When determining that the 2 fingers with the high success rate of collation are unstable (Yes in step S307), the determining unit 402 increases the number of successful fingers by 1 (step S308). Then, the determining unit 402 ends the process.

On the other hand, when determining that the 2 fingers with the high success rate of collation are not unstable (No in step S307), the determining unit 402 determines whether or not the success rate of authentication is 50% or less (step S309). For example, the determining unit 402 calculates the success rate of authentication by using the collation frequency and the success frequency in the user table 302, and determines whether or not the success rate of authentication is 50% or less. When determining that the success rate of authentication is 50% or less (Yes in step S309), the determining unit 402 increases the number of accepted fingers by 1 (step S310). Then, the determining unit 402 ends the process. On the other hand, when the determining unit 402 does not determine that the success rate of authentication is 50% or less (No in step S309), it ends the process.

The above-mentioned procedure is not limited to the order described above. The order of the procedure may be changed, as needed, within the range consistent with the content of the process. For example, in the example in FIG. 10, any one of the processes in steps S302, S304, S306, S308, and S310 is executed, or none of these processes is executed. However, the present invention is not limited thereto. For example, one or plural processes in steps S302, S304, S306, S308, and S310 may be executed. Specifically, as illustrated in FIG. 11, the determining unit 402 may perform the processes in steps S401, S403, S405, S407, and S409 every time. Steps S401 to S410 in FIG. 11 correspond to steps S301 to S310 in FIG. 10. FIG. 11 is a flowchart illustrating one example of the flow of the process by the determining unit according to the second embodiment.

Effect of Second Embodiment

As described above, according to the second embodiment, the fingerprint authentication apparatus 200 stores the fingerprint data for plural fingers, and stores the history of the result of the authentication process. The fingerprint authentication apparatus 200 determines the number of accepted fingers and the false acceptance rate based upon the history. The fingerprint authentication apparatus 200 accepts the fingerprint data from the fingers in the determined number of accepted fingers, and makes collation as to whether each of the accepted fingerprint data coincides with the stored fingerprint data by using the determined false acceptance rate. Then, the fingerprint authentication apparatus 200 authenticates the user based upon the collation result. As a result, the accuracy in the fingerprint authentication can be kept high, and operability can be enhanced according to the second embodiment.

The meaning of the fingerprint authentication apparatus 200 according to the second embodiment will briefly be described. Currently, there is a rapid increase in the number of systems using the fingerprint authentication upon releasing a lock on a cellular phone or upon logging in a personal computer. The reason for this is that a capacity and cost of a fingerprint sensor are reduced, and processing power of a cellular phone or personal computer increases. In the description below, the personal computer is also referred to as "PC (Personal Computer)".

In general, one finger is used to execute the fingerprint authentication, and in order to avoid the erroneous collation, the fingerprint authentication with the false acceptance rate of $1/1000$ to $1/1000$ is applied for the fingerprint authentication. However, when the false acceptance rate of $1/1000$ to $1/1000$ is applied, several percent cannot use the fingerprint authentication. For example, a person with rough hand cannot use the fingerprint authentication. This problem similarly occurs when an optical fingerprint sensor is used and when a magnetic/field fingerprint sensor is used.

There are two causes considered. One is the problem of a rough hand. A fingerprint is often missing in a person with rough hand. The surface of the finger is easy to be changed, so that the fingerprint is likely to be different from the registered fingerprint. The other is the problem of the fingerprint sensor. In recent years, a cost of a PC has significantly been reduced, and tough cost cutting has been demanded for the fingerprint sensor under this influence. The mainstream of a model of PC has been changed to a notebook type from a desk-top type, and reduction in capacity has been demanded. Accordingly, it is difficult to apply various members useful for appropriately working the fingerprint authentication. A uniform and powerful light source, a wide sensor area, and a large frame buffer for increasing a frame rate for extraction correspond to the various members useful for appropriately working the fingerprint authentication. Consequently, even if the performance of PC is enhanced, the rate of a person who cannot use the fingerprint authentication is not changed so much up to the present date from the time when the fingerprint authentication is first employed for the PC.

A technique of simply reducing the false acceptance rate is considered. A malicious login does not occur when someone is erroneously not authenticated. However, when somebody else is erroneously authenticated, a malicious login occurs, which is a very significant problem. In light of this, the fingerprint authentication apparatus 200 does not simply reduce the false acceptance rate, but utilizes that a person has 10 fingers. The fingerprint authentication apparatus 200 executes the fingerprint authentication by using plural fingers out of 10 fingers. For example, all of 6 fingers, out of 10 fingers, which are easy to be used for the fingerprint authentication are used to execute the fingerprint authentication. In this case, the value of $1/60$ is used as the false acceptance rate used for the collation process of each finger. Even a finger of a rough hand often succeeds in the collation, if the false acceptance rate of about $1/300$ is applied.

As a result, the number of persons who cannot use the fingerprint authentication can dramatically be reduced. If the condition is set such that 3 or more fingers of 6 fingers are successful even if the false acceptance rate of $1/60$, which is relatively larger than the false acceptance rate of $1/1000$, is employed, the accuracy in the whole authentication process becomes $1/1215 \approx 1/1000$ according to the binominal distribution. Specifically, even if the value of "$1/60$" is used as the false acceptance rate applied to each finger, the accuracy of the whole authentication process can be set as the false acceptance rate of $1/1000$.

The fingerprint authentication apparatus 200 determines a large false acceptance rate, compared to the case where the number of accepted fingers is small, when the number of accepted fingers is large. When the number of accepted fingers is small, the fingerprint authentication apparatus 200 determines a smaller false acceptance rate, compared to the case where the number of accepted fingers is large. As a result, the accuracy in the fingerprint authentication can be kept high according to the second embodiment.

The fingerprint authentication apparatus 200 determines the number of successful fingers, the number of accepted fingers, and the false acceptance rate in order that the authentication accuracy determined by the number of successful fingers, the number of accepted fingers, and the false acceptance rate becomes equivalent. The fingerprint authentication apparatus 200 determines that the authentication is successful, when the collation is successful for the fingerprint data not less than the number of successful fingers determined by the determining unit 402. As a result, the fingerprint authentication apparatus 200 can be used for a person with a rough hand, whereby the accuracy in the fingerprint authentication can be kept high.

The fingerprint authentication apparatus 200 calculates the success rate for each finger by referring to the user table 302, and when there are 2 or more fingers with the calculated success rate higher than the threshold value, it decreases the number of successful fingers. As a result, the number of accepted fingers can more be reduced according to the second embodiment.

As the number of accepted fingers is smaller, the number of fingers from which fingerprint data is inputted by the user is small, whereby operability is enhanced. The number of accepted fingers cannot be set to be less than the number of successful fingers even at a minimum. Therefore, when there are 2 or more fingers with the success rate higher than the threshold value, the fingerprint authentication apparatus 200 decreases the number of successful fingers in anticipation of these 2 fingers continuously succeeding in authentication. As a result, the maximum number of decreasing the number of accepted fingers can be increased in the (Type 1).

The fingerprint authentication apparatus 200 calculates the success rate for each finger by referring to the user table 302, and excludes the finger with the calculated success rate less than a threshold value from the fingers from which fingerprint data is accepted from the user. As described above, the fingerprint authentication apparatus 200 excludes the finger that does not contribute to the authentication process, whereby the number of the fingers from which the fingerprint data is extracted decreases, whereby the operability of the normal user is enhanced. Since the false acceptance rate used for the collation process increases, whereby the possibility that the normal user succeeds in the collation can be increased, and hence, the possibility that the normal user succeeds in the authentication is increased.

The fingerprint authentication apparatus 200 calculates the success rate for each finger by referring to the user table 302, and preferentially determines the finger with the calculated higher success rate as the finger from which the fingerprint data is accepted from the user, compared to the other fingers. As a result, the user is easy to be authenticated, since the finger with the higher success rate is preferentially used.

The fingerprint authentication apparatus 200 calculates the rate that the user is authenticated by referring to the user table 302, and when the calculated rate is less than a threshold value, it increases the number of accepted fingers. The case in which the rate that the user is authenticated is less than the threshold value means that the authentication process is not successful, and the number of accepted fingers, the number of successful fingers, or the setting of the finger from which fingerprint data is accepted from the user, might not be appropriate. In light of this, the fingerprint authentication apparatus 200 increases the number of accepted fingers by "1" so as to make the number of accepted fingers close to the initial setting. As a result, the false acceptance rate is reduced, since the number of accepted fingers increases by "1". However, when the success rate of the finger whose fingerprint data is newly accepted is good, the success rate dramatically increases. For example, this process is effective for the case where the injured finger is excluded from the subjects to be collated, and this finger is healed.

When the fingerprint authentication apparatus 200 stores the fingerprint data into the user table 302, it accepts plural fingerprint data for each of plural fingers, and calculates, for each finger, the degree of correlation among the accepted plural fingerprint data for each finger. The fingerprint authentication apparatus 200 stores the fingerprint data of the finger from which the degree of correlation not less than the threshold value is calculated in the user table 302. Accordingly, the finger with the low degree of correlation is not even registered, whereby the data amount inputted to the user table 302 can be reduced, and unnecessary process for an address process can be reduced.

Third Embodiment

The embodiments of the present invention have been described above. However, the present invention may be embodied by other embodiments. The other embodiments will be described below.

[FAR Table]

In the above-mentioned embodiments, the FAR table 301 stores the false acceptance rate in association with the combination of the number of accepted fingers and the number of successful fingers. However, the present invention is not limited thereto. For example, the FAR table 301 may simply store the number of accepted fingers, the number of successful fingers, the false acceptance rate, and authentication accuracy, in association with one another, without combining the number of accepted fingers and the number of successful fingers.

For example, in the above-mentioned embodiments, the fingerprint authentication apparatus 200 acquires the false acceptance rate from the FAR table 301 by using the number of accepted fingers and the number of successful fingers. However, the present invention is not limited thereto. For example, the fingerprint authentication apparatus 200 may use a value of a false acceptance rate, which is desired to be used for the collation, and may acquire the number of accepted fingers and the number of successful fingers that satisfy such false acceptance rate from the FAR table 301.

[Degree of Coincidence]

In the above-mentioned embodiments, the fingerprint authentication apparatus 200 determines the number of accepted fingers and the number of successful fingers by using the success rate, but the present invention is not limited thereto. For example, the fingerprint authentication apparatus 200 may store a log of a rate of coincidence between the fingerprint data accepted from the user and the fingerprint data registered to the user table 302 every execution of the collation process, and may determine the number of accepted fingers and the number of successful fingers by using the log of the rate of coincidence. The rate of coincidence indicates to what degree the fingerprint data accepted from the user and the fingerprint data registered to the user table 302 coincide with each other. For example, the rate of coincidence is calculated by checking the maximum value of the false acceptance rate by which the collation is successful. For example, the fingerprint authentication apparatus 200 may decrease the number of successful fingers by 1 as in the (Type 2), when there are 2 fingers having the rate of coincidence higher than a threshold value. More specifically, the fingerprint authentication apparatus 200 decreases the number of successful fingers when there are 2 or more fingers that represent the rate of coincidence indicating that the collation is successful even with the false acceptance rate of "$1/1000$". Although the false acceptance rate decreases, it is no problem if the 2 fingers, which represent the rate of coincidence indicating that the collation is successful even with "$1/1000$", succeed in the collation.

[Fingerprint Authentication]

In the above-mentioned embodiments, the fingerprint authentication apparatus 200 executes the fingerprint authentication. However, the present invention is not limited thereto. Specifically, the fingerprint authentication apparatus 200 may execute vein authentication by using a vein of a finger.

[System Configuration]

All or some of the processes, which are described as being automatically carried out, out of the processes described in the embodiments may manually be carried out. Alternatively, all or some of the processes, which are descried as being manually carried out, may automatically be carried out by a known method. For example, the fingerprint data may manually be inputted to the user table 302. In addition, the procedures, control procedures, specific names, and information including various data and parameters (FIGS. 1 to 11) described in the specification and drawings may arbitrarily be changed, unless otherwise specified.

The respective components of the respective apparatuses illustrated in the drawings are only functional concepts, and it is unnecessary that these components are physically configured as illustrated in the figures. Specifically, the specific forms of the separation and combination of the respective apparatuses are not limited to those illustrated in the figures. All or some of the apparatuses can be configured as being functionally or physically separated or combined in any unit according to various loads and working condition. For example, the fingerprint sensor may be connected to the fingerprint authentication apparatus via network as an external device. The storage unit 300 may be provided respectively in different apparatuses, and they may be connected through network in cooperation with one another, whereby the function of the fingerprint authentication apparatus 200 may be realized.

[Computer]

Figure 12:
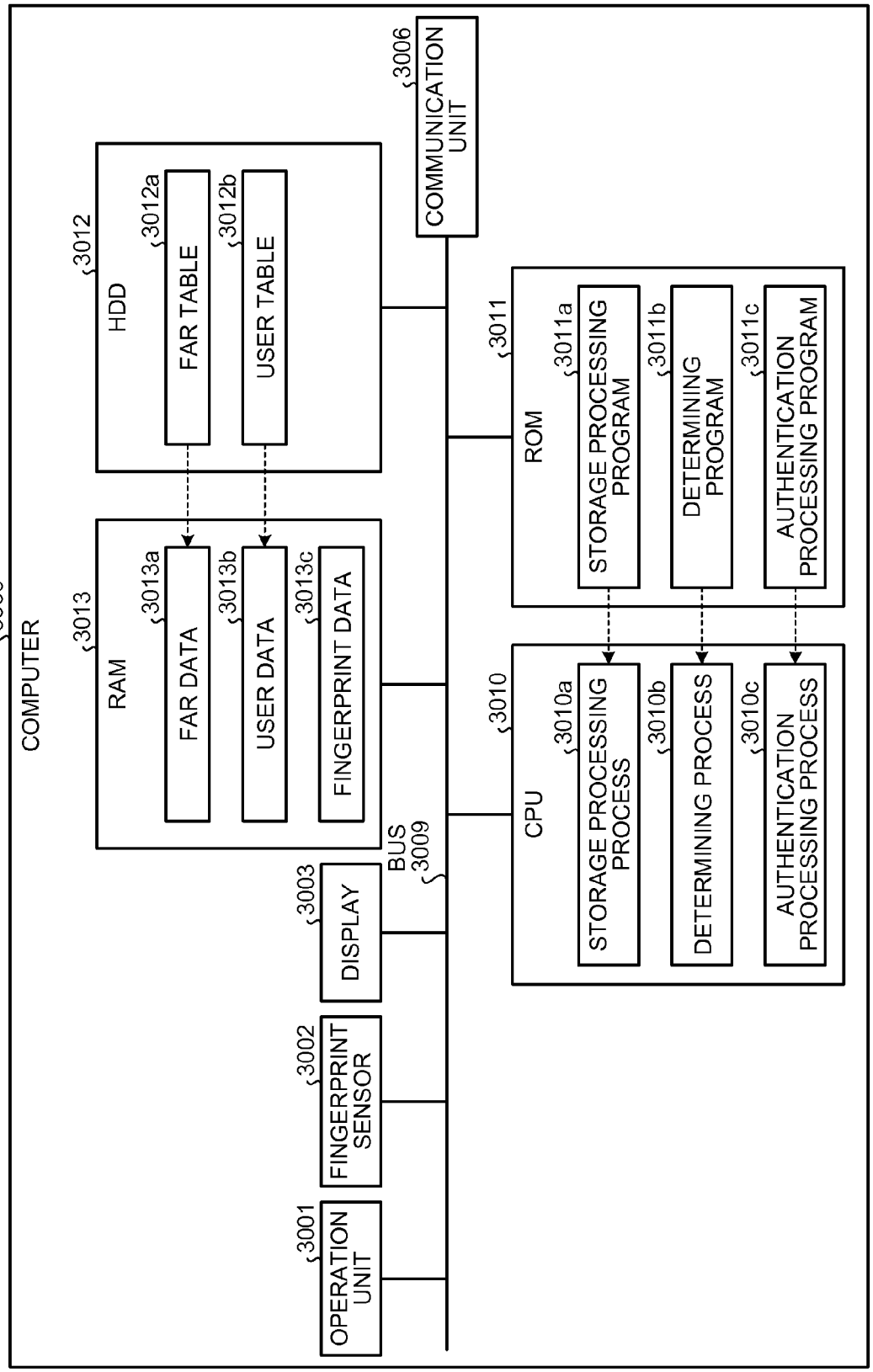
FIG. 12 is a view for describing one example of a computer that executes an authentication program according to the second embodiment.

Various processes described in the above-mentioned embodiments can be realized through an execution of a program, prepared beforehand, by a computer such as a personal computer or a work station. One example of a computer executing a fingerprint authentication program having the same function as in the above-mentioned embodiments will be described below with reference to FIG. 12. FIG. 12 is a view for describing one example of a computer executing the fingerprint authentication program according to the second embodiment.

As illustrated in FIG. 12, a computer 3000 according to the second embodiment includes an operation unit 3001, a fingerprint sensor 3002, a display 3003, a communication unit 3006, a CPU 3010, a ROM 3011, a HDD (Hard Disk Drive) 3012, and a RAM 3013. In the computer 3000, the operation unit 3001 to the RAM 3013 are connected by a bus 3009.

The ROM 3011 stores beforehand a control program exhibiting the function same as the functions of the storage processing unit 401, the determining unit 402, and the authentication processing unit 403 described in the second embodiment. Specifically, as illustrated in FIG. 12, the ROM 3011 stores beforehand a storage processing program 3011a, a determining program 3011b, and an authentication processing program 3011c. These programs 3011a to 3011c may be combined or separated, as needed, like the respective components of the fingerprint authentication apparatus 200 illustrated in FIG. 2.

The CPU 3010 reads the programs 3011a to 3011c from the ROM 3011, and executes these programs. As a result, the respective programs 3011a to 3011c function as a storage processing process 3010a, a determining process 3010b, and an authentication processing process 3010c as illustrated in FIG. 12. The respective processes 3010a to 3010c correspond to the storage processing unit 401, the determining unit 402, and the authentication processing unit 403 illustrated in FIG. 2 respectively.

The HDD 3012 is provided with a FAR table 3012a and a user table 3012b. The tables 3012a and 3012b respectively correspond to the FAR table 301 and the user table 302 illustrated in FIG. 2.

The CPU 3010 reads the FAR table 3012a and the user table 3012b, and stores these tables in the RAM 3013. Then, the CPU 3010 executes the fingerprint authentication program by using FAR data 3013a, user data 3013b, and storage data 3013c stored in the RAM 3013.

[Others]

The fingerprint authentication program described in the embodiments can be distributed through network such as the Internet. The fingerprint authentication program can be recorded on a computer-readable recording medium such as a hard disk, flexible disk (FD), CD-ROM, MO, or DVD, read from the recording medium by a computer, and executed.

The present invention can keep high accuracy in fingerprint authentication, and can enhance operability.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A fingerprint authentication apparatus comprising:
a memory; and
a processor coupled to the memory, wherein the processor executes a process comprising:
storing fingerprint data of a plurality of fingers of a user;
storing a history of a result of an authentication process executed using the stored fingerprint data;
first determining, based upon the stored history, a set of a number of accepted fingers, a false acceptance rate thereof and a number of successful fingers, such that authentication accuracy determined by the set becomes a predetermined value, the number of accepted fingers being a number of fingers of the user from which fingerprint data are required to be accepted from a fingerprint sensor during the authentication process, the false acceptance rate being a threshold value used for determining either of a coincidence or non-coincidence of the accepted fingerprint data and the respective stored fingerprint data according to a degree of similarity therebetween, the number of successful fingers being a number of fingers of the user for each of which the coincidence is determined and which is requested for a successful authentication;
accepting fingerprint data from the fingers of the user, a number of the fingers equaling the first determined number of accepted fingers required;
second determining either of the coincidence or non-coincidence of the accepted fingerprint data and the respective stored fingerprint data using the first determined false acceptance rate as the threshold value; and
authenticating the user based upon the second determined coincidence, wherein the stored history includes a calculated rate of the second determined coincidence for each finger of the user, wherein
the first determining includes calculating a rate of the second determined coincidence for each finger by referring to the stored history, and when there are two or more fingers having the calculated rate higher than the threshold value, determining the number of accepted fingers required and the false acceptance rate, after reducing the number of successful fingers.

2. The fingerprint authentication apparatus according to claim 1, wherein
when the number of accepted fingers is larger than the threshold value, the first determining includes determining a larger false acceptance rate than a false acceptance rate for the number of accepted fingers that is smaller than the threshold value, and when the number of accepted fingers is smaller than the threshold value, the first determining includes determining a smaller false acceptance rate than a false acceptance rate for the number of accepted fingers that is larger than the threshold value.

3. The fingerprint authentication apparatus according to claim 2, wherein
the authenticating includes determining that an authentication of the user is successful, when the number of fingers for each of which the coincidence is determined at the second determining is not less than the first determined number of successful fingers.

4. The fingerprint authentication apparatus according to claim 1, wherein
the first determining includes calculating, for each finger, a rate of the second determined coincidence by referring to the stored history, and excluding a finger having the calculated rate less than the threshold value from fingers from which the fingerprint data are accepted from the user.

5. The fingerprint authentication apparatus according to claim 1, wherein the first determining includes calculating, for each finger, a rate of the second determined coincidence by referring to the stored history, and determining a finger, which has the calculated rate that is higher, compared to other fingers, as the finger from which the fingerprint data is accepted from the user.

6. The fingerprint authentication apparatus according to claim 1, wherein
the first determining includes calculating a rate that the user is authenticated at the authenticating, by referring to the stored history, and increasing the number of accepted fingers, when the calculated rate is less than the threshold value.

7. The fingerprint authentication apparatus according to claim 1, wherein
the storing of fingerprint data includes accepting a plurality of fingerprint data for each finger;
calculating, for each finger, a degree of correlation among the accepted plurality of fingerprint data; and storing fingerprint data for a finger for which the calculated degree of correlation is not less than the threshold value.

8. A fingerprint authentication method comprising:

first determining, using a processor, a set of a number of accepted fingers, a false acceptance rate thereof and a number of successful fingers, based upon a history of a result of an authentication process executed using fingerprint data, stored in a fingerprint storage, of a plurality of fingers of a user, such that authentication accuracy determined by the set becomes a predetermined value, the number of accepted fingers being a number of fingers of the user from which fingerprint data are required to be accepted from a fingerprint sensor during the authentication process, the false acceptance rate being a threshold value used for determining either of a coincidence or non-coincidence of the accepted fingerprint data and the respective stored fingerprint data according to a degree of similarity therebetween, the number of successful fingers being a number of fingers of the user for each of which the coincidence is determined and which is requested for a successful authentication, the history being stored in a history storage;

accepting fingerprint data from fingers of the user, a number of the fingers equaling the first determined number of accepted fingers required, using the processor;

second determining either of the coincidence or non-coincidence of the accepted fingerprint data and the respective stored fingerprint data using the first determined false acceptance rate as the threshold value, using the processor; and authenticating the user based upon the second determined coincidence, wherein the stored history includes a calculated rate of the second determined coincidence for each finger of the user, using the processor, wherein the first determining includes calculating a rate of the second determined coincidence for each finger by referring to the stored history, and when there are two or more fingers having the calculated rate higher than the threshold value, determining the number of accepted fingers required and the false acceptance rate, after reducing the number of successful fingers.

9. The fingerprint authentication method according to claim 8, wherein when the number of accepted fingers is larger than the threshold value, the first determining includes determining a larger false acceptance rate than a false acceptance rate for the number of accepted fingers that is smaller than the threshold value, and when the number of accepted fingers is smaller than the threshold value, the first determining includes determining a smaller false acceptance rate than a false acceptance rate for the number of accepted fingers that is larger than the threshold value.

10. The fingerprint authentication method according to claim 9, wherein the authenticating includes determining that an authentication of the user is successful, when the number of fingers for each of which the coincidence is determined at the second determining is not less than the first determined number of successful fingers.

11. The fingerprint authentication method according to claim 8, wherein the first determining includes calculating, for each finger, a rate of the second determined coincidence by referring to the history, and excluding a finger having the calculated rate less than the threshold value from fingers from which the fingerprint data are accepted from the user.

12. The fingerprint authentication method according to claim 8, wherein the first determining includes calculating, for each finger, a rate of the second determined coincidence by referring to the history, and determining a finger, which has the calculated rate that is higher, compared to other fingers, as the finger from which the fingerprint data is accepted from the user.

13. The fingerprint authentication method according to claim 8, wherein the first determining includes calculating a rate that the user is authenticated at the authenticating, by referring to the history, and increasing the number of accepted fingers, when the calculated rate is less than the threshold value.

14. The fingerprint authentication method according to claim 8, further comprising:

accepting a plurality of fingerprint data for each finger;

calculating, for each finger, a degree of correlation among the accepted plurality of fingerprint data; and storing fingerprint data into the fingerprint storage for a finger for which the calculated degree of correlation is not less than the threshold value.

15. A non-transitory computer-readable recording medium having stored therein a program that causes a computer to execute a fingerprint authentication process comprising:

first determining a set of a number of accepted fingers, a false acceptance rate thereof and a number of successful fingers, based upon a history of a result of an authentication process executed using fingerprint data, stored in a fingerprint storage, of a plurality of fingers of a user, such that authentication accuracy determined by the set becomes a predetermined value, the number of accepted fingers being a number of fingers of the user from which fingerprint data are required to be accepted from a fingerprint sensor during the authentication process, the false acceptance rate being a threshold value used for determining either of a coincidence or non-coincidence of the accepted fingerprint data and the respective stored fingerprint data according to a degree of similarity therebetween, the number of successful fingers being the number of fingers of the user for each of which the coincidence is determined and which is requested for a successful authentication, the history being stored in a history storage;

accepting fingerprint data from fingers of the user, the number of the fingers equaling the first determined number of accepted fingers required;

second determining either of the coincidence or non-coincidence of the accepted fingerprint data and the respective stored fingerprint data using the first determined false acceptance rate as the threshold value; and authenticating the user based upon the second determined coincidence, wherein the stored history includes a calculated rate of the second determined coincidence for each finger of the user, wherein the first determining includes calculating a rate of the second determined coincidence for each finger by referring to the stored history, and when there are two or more fingers having the calculated rate higher than the threshold value, determining the number of accepted fingers required and the false acceptance rate, after reducing the number of successful fingers.

* * * * *